(12) United States Patent
Watts et al.

(10) Patent No.: US 12,085,833 B2
(45) Date of Patent: Sep. 10, 2024

(54) OPTICAL PHASED ARRAY LIGHT STEERING

(71) Applicant: Analog Photonics LLC, Boston, MA (US)

(72) Inventors: Michael Robert Watts, Hingham, MA (US); Katia Shtyrkova, Lexington, MA (US); Christopher Vincent Poulton, Cambridge, MA (US); Ehsan Shah Hosseini, Boston, MA (US); Benjamin Roy Moss, Cambridge, MA (US)

(73) Assignee: Analog Photonics LLC, Boston, MA (US)

( * ) Notice: Subject to any disclaimer, the term of this patent is extended or adjusted under 35 U.S.C. 154(b) by 225 days.

(21) Appl. No.: 17/501,419

(22) Filed: Oct. 14, 2021

(65) Prior Publication Data

US 2022/0146903 A1    May 12, 2022

Related U.S. Application Data

(60) Provisional application No. 63/203,468, filed on Jul. 23, 2021, provisional application No. 63/112,301, filed on Nov. 11, 2020.

(51) Int. Cl.
*G02B 6/12*      (2006.01)
*G01S 7/481*     (2006.01)
(Continued)

(52) U.S. Cl.
CPC ............ *G02F 1/292* (2013.01); *G01S 7/4817* (2013.01); *G02B 6/12009* (2013.01);
(Continued)

(58) Field of Classification Search
CPC .................................................. G02B 6/12009
See application file for complete search history.

(56) References Cited

U.S. PATENT DOCUMENTS

| 4,203,105 A | 5/1980 | Dragone et al. |
| 4,618,867 A | 10/1986 | Gans |
| (Continued) | | |

FOREIGN PATENT DOCUMENTS

| CN | 107611779 A | 1/2018 |
| CN | 109343034 A * | 2/2019 |
| (Continued) | | |

OTHER PUBLICATIONS

English translation of WO-2018124285-A1 (Year: 2018).*
(Continued)

*Primary Examiner* — Charlie Y Peng
(74) *Attorney, Agent, or Firm* — Young Basile Hanlon & MacFarlane, P.C.

(57) ABSTRACT

An apparatus includes: an optical phased array (e.g., on a photonic integrated circuit), a focusing element, which can be at a fixed position relative to the optical phased array and configured to receive an optical beam from the optical phased array, and a steering element, which can be at a fixed position relative to the focusing element and configured to transmit the optical beam received from the focusing element. In some implementations, at least one of the focusing element or the steering element is externally coupled to the photonic integrated circuit.

49 Claims, 42 Drawing Sheets

(51) Int. Cl.
*G02F 1/29* (2006.01)
*H04B 10/112* (2013.01)
*H04B 10/40* (2013.01)

(52) U.S. Cl.
CPC ......... *H04B 10/1123* (2013.01); *H04B 10/40* (2013.01); *G02F 2201/30* (2013.01); *G02F 2201/34* (2013.01)

(56) References Cited

U.S. PATENT DOCUMENTS

| | | | |
|---|---|---|---|
| 4,705,400 | A | 11/1987 | Ellerbroek et al. |
| 6,721,057 | B1 | 4/2004 | Reininger |
| 6,924,923 | B2 * | 8/2005 | Serati ................. G02B 26/0833 359/260 |
| 10,545,289 | B1 * | 1/2020 | Chriqui ................. G01S 7/4818 |
| 2003/0231308 | A1 | 12/2003 | Granger |
| 2005/0162762 | A1 | 7/2005 | Novak |
| 2006/0267851 | A1 | 11/2006 | Turner |
| 2009/0114629 | A1 | 5/2009 | Gross et al. |
| 2012/0120410 | A1 | 5/2012 | Sitter, Jr. |
| 2017/0003507 | A1 | 1/2017 | Raval et al. |
| 2017/0315420 | A1 | 11/2017 | Watts et al. |
| 2018/0011173 | A1 * | 1/2018 | Newman ................. B60S 1/0818 |
| 2018/0231643 | A1 | 8/2018 | Lee et al. |
| 2018/0267250 | A1 | 9/2018 | Hosseini et al. |
| 2019/0056634 | A1 * | 2/2019 | Hosseini ................. G02F 1/292 |
| 2019/0243081 | A1 | 8/2019 | Watts et al. |
| 2020/0333683 | A1 | 10/2020 | Skirlo et al. |
| 2022/0065999 | A1 * | 3/2022 | Phare ................. G01S 7/4818 |
| 2022/0146903 | A1 | 5/2022 | Watts et al. |

FOREIGN PATENT DOCUMENTS

| | | | | |
|---|---|---|---|---|
| EP | 2778711 | A1 | 9/2014 | |
| WO | WO-0070302 | A1 * | 11/2000 | ............. G01J 3/021 |
| WO | 2014140528 | A1 | 9/2014 | |
| WO | WO-2018124285 | A1 * | 7/2018 | ............. G01N 21/01 |
| WO | 2020171946 | A1 | 8/2020 | |
| WO | 2021153828 | A1 | 8/2021 | |

OTHER PUBLICATIONS

WO 0070302 A1 English translation (Year: 2000).*
CN-109343034-A English translation (Year: 2019).*
Kim et al., "Compact Solid-State Optical Phased Array Beam Structures Based on Polymeric Photonic Integrated Circuits", Nature Portfolio, Scientific Reports, May 19, 2021, https://doi.org/10.1038/s41598-021-90120-x.
Kossey et al., "End-fire silicon optical phased array with half-wavelength spacing", APL Photonics 3, 011301, Dec. 20, 2017, https://doi.org/10.1063/1.5000741.
Yoon et al., "Collimation of diverged beam using a cylindrical lens in a silicon-based end-fire optical phased array", Electronics Letters, vol. 56, No. 7, Mar. 30, 2020, pp. 337-339.
Zhi Li et al., "Virtually imaged phased-array-based 2D nonmechanical beam-steering device for FMCW LiDAR," Appl. Opt., vol. 60, No. 8, pp. 2177-2189, Mar. 10, 2021, https://doi.org/10.1364/AO.414128.
Liang Wu et al., "Arbitrary multiple beam forming by two cascaded liquid crystal optical phased arrays," Optics Express, vol. 26, No. 13, pp. 17066-17077, Jun. 25, 2018, https://doi.org/10.1364/OE.26.017066.
Office Action issued in corresponding U.S. Appl. No. 17/740,530, dated Nov. 17, 2023.

* cited by examiner

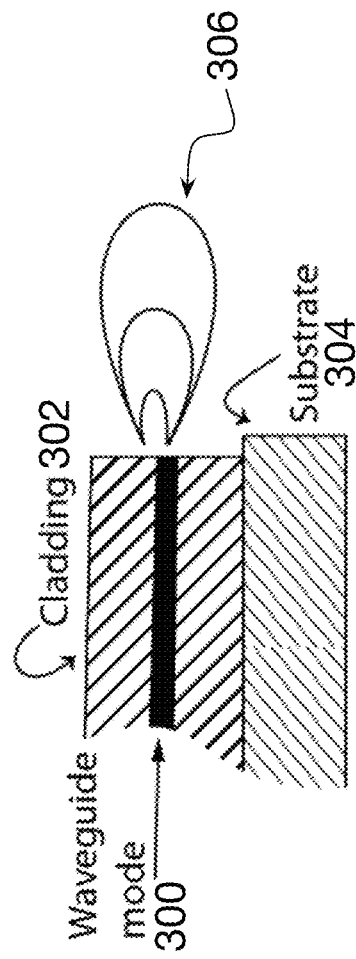
FIG. 3A
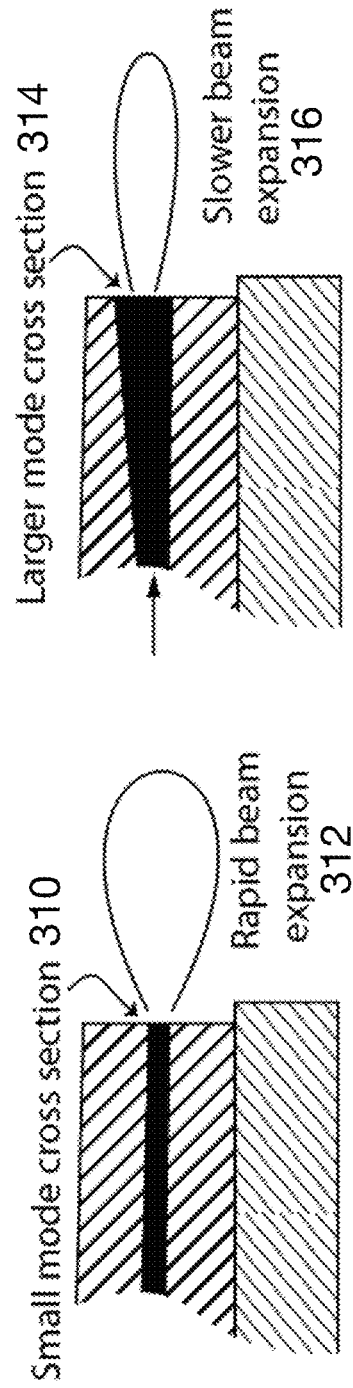
FIG. 3B
FIG. 3C

OPTICAL PHASED ARRAY LIGHT STEERING

CROSS-REFERENCE TO RELATED APPLICATION(S)

This application claims priority to and the benefit of U.S. Provisional Application Ser. No. 63/112,301, entitled "Optical Phased Array Light Steering," filed Nov. 11, 2020, and U.S. Provisional Application Ser. No. 63/203,468, entitled "Optical Phased Array Light Steering," filed Jul. 23, 2021, each of which is incorporated by reference herein.

TECHNICAL FIELD

This disclosure relates to optical phased array light steering.

BACKGROUND

Some optical phased arrays (OPAs) have a linear distribution of emitter elements (also called emitters or antennas). Steering about a first axis perpendicular to the linear distribution can be provided by changing the relative phase shifts in phase shifters feeding each of the emitter elements. Other techniques can be used for steering about a second axis orthogonal to the first axis.

SUMMARY

In one aspect, in general, an apparatus comprises: a photonic integrated circuit comprising an optical phased array, a focusing element at a fixed position relative to the optical phased array and configured to receive an optical beam from the optical phased array, and a steering element at a fixed position relative to the focusing element and configured to transmit the optical beam received from the focusing element. At least one of the focusing element or the steering element is externally coupled to the photonic integrated circuit.

Aspects can include one or more of the following features.

The steering element comprises a dispersive element.

The dispersive element comprises a diffractive element.

The dispersive element comprises a refractive element.

The refractive element comprises a prism.

The focusing element comprises a lens.

The focusing element comprises a reflective surface.

The photonic integrated circuit, the focusing element, and the steering element are included in at least a portion of a LiDAR system.

The photonic integrated circuit, the focusing element, and the steering element are included in at least a portion of a free space optical link of a communication system.

In another aspect, in general, an apparatus comprises: an optical phased array, a reflective surface at a fixed position relative to the optical phased array and configured to redirect an optical beam received from the optical phased array, and a steering element at a fixed position relative to the reflective surface and configured to transmit the optical beam redirected from the reflective surface.

Aspects can include one or more of the following features.

The reflective surface is shaped to substantially collimate the optical beam in at least a first plane.

The apparatus further comprises an optical source configured to provide an optical wave to antenna elements of the optical phased array.

Relative phase shifts among the antenna elements provide steering of the optical beam emitted from the optical phased array in a second plane perpendicular to the first plane.

The steering element comprises a diffractive element, the optical source comprises a tunable optical source configured to tune a wavelength of the optical wave provided to the antenna elements of the optical phased array, and the tuned wavelength provides steering of the optical beam emitted from the diffractive element in the first plane.

The steering element comprises a diffractive element that is configured to be tuned electronically to steer the beam in the first plane.

The optical phased array, the reflective surface, and the steering element are included in at least a portion of a LiDAR system.

The optical phased array, the reflective surface, and the steering element are included in at least a portion of a free space optical link of a communication system.

In another aspect, in general, an apparatus comprises: an optical phased array, a lens at a fixed position relative to the optical phased array and configured to receive an optical beam from the optical phased array, and a steering element at a fixed position relative to the lens and configured to transmit the optical beam received from the lens.

Aspects can include one or more of the following features.

The lens is shaped to substantially collimate the optical beam in at least a first plane.

The apparatus further comprises an optical source configured to provide an optical wave to antenna elements of the optical phased array.

Relative phase shifts among the antenna elements provide steering of the optical beam emitted from the optical phased array in a second plane perpendicular to the first plane.

The steering element comprises a diffractive element, the optical source comprises a tunable optical source configured to tune a wavelength of the optical wave provided to the antenna elements of the optical phased array, and the tuned wavelength provides steering of the optical beam emitted from the diffractive element in the first plane.

The steering element comprises a diffractive element that is configured to be tuned electronically to steer the beam in the first plane.

The optical phased array comprises a plurality of antenna elements that are coupled to respective optical waveguides formed in a photonic integrated circuit.

The optical phased array, the lens, and the steering element are included in at least a portion of a LiDAR system.

The optical phased array, the lens, and the steering element are included in at least a portion of a free space optical link of a communication system.

In another aspect, in general, an apparatus comprises: a plurality of optical phased arrays, and a focusing element at a fixed position relative to the optical phased arrays and configured to receive optical beams from the optical phased arrays. The focusing element is positioned and configured to substantially collimate the optical beams in at least a first plane.

Aspects can include one or more of the following features.

The optical phased arrays and the focusing element are included in at least a portion of a LiDAR system.

The optical phased arrays and the focusing element are included in at least a portion of a free space optical link of a communication system.

The plurality of optical phased arrays are arranged on respective pedestals, where each optical phased array comprises a linear array of emitter elements arranged along a first axis, and each linear array of emitter elements is offset with respect to the other linear arrays along the first axis and offset with respect to the other linear arrays along a second axis perpendicular to the first axis.

In another aspect, in general, an apparatus comprises: an optical phased array, and a focusing steering element at a fixed position relative to the optical phased array and configured to receive an optical beam from the phased array, wherein the focusing steering element is configured to: substantially collimate the optical beam in at least a first plane, and steer the optical beam in the first plane.

Aspects can include one or more of the following features.

The focusing steering element comprises a focusing diffractive element.

The optical phased array and the focusing steering element are included in at least a portion of a LiDAR system.

The optical phased array and the focusing steering element are included in at least a portion of a free space optical link of a communication system.

In another aspect, in general, an apparatus comprises: an optical phased array, and a reflective focusing element at a fixed position relative to the optical phased array and configured to receive an optical beam from the optical phased array and transmit the optical beam.

Aspects can include one or more of the following features.

The reflective focusing element comprises a reflective surface.

The apparatus further comprises a diffractive element at a fixed position relative to the reflective focusing element and configured to transmit the optical beam redirected from the reflective surface.

The diffractive element comprises a curved diffractive element that transmits the optical beam through the curved diffractive element.

The optical phased array and the reflective focusing element are included in at least a portion of a LiDAR system.

The optical phased array and the reflective focusing element are included in at least a portion of a free space optical link of a communication system.

Aspects can have one or more of the following advantages.

The techniques described herein can be used for providing a variety of steering and/or focusing mechanisms for an OPA-based transceiver including one or more OPAs. The transceiver can be used for transmitting and/or receiving an optical beam at a desired angle of transmission and/or reception. In some implementations of an OPA-based transceiver, one or more photonic integrated circuits (or chips) include a linear arrangement of OPA antennas that emit light that coherently interferes to provide a beam that is steered about a first axis using OPA phase shifts. The OPA-based transceiver can be configured in a compact and efficient manner to include any of a variety of other steering mechanisms for steering about a second axis that is perpendicular to the first axis. Beam collimation can also be provided by a variety of techniques, as described in more detail below. These techniques can be used, for example, for OPA-based LiDAR sensor systems, and for telecommunication terminals, such as nodes of a communication system that uses free space optical links between nodes. For such optical systems, the waves forming the beams have a spectrum that has a peak wavelength that falls in a particular range of optical wavelengths (e.g., between about 100 nm to about 1 mm, or some subrange thereof), also referred to as optical waves, light waves, or simply light.

Other features and advantages will become apparent from the following description, and from the figures and claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 3A, 3B, and 3C are schematic diagrams of OPA beam expansion.

DETAILED DESCRIPTION

Figure 1:
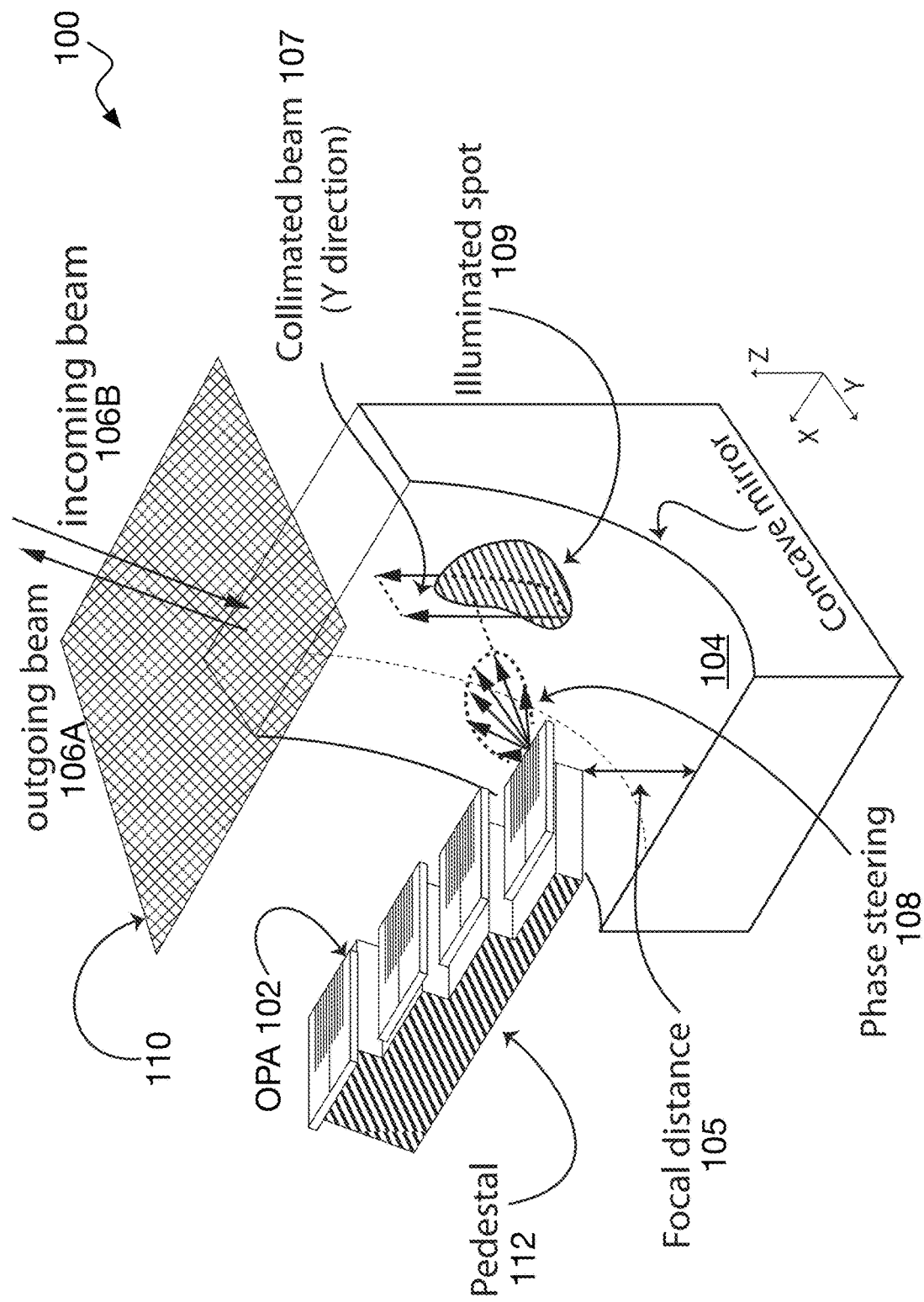
FIG. 1 is a schematic diagram of an example OPA-based transceiver.
Figure 26A:
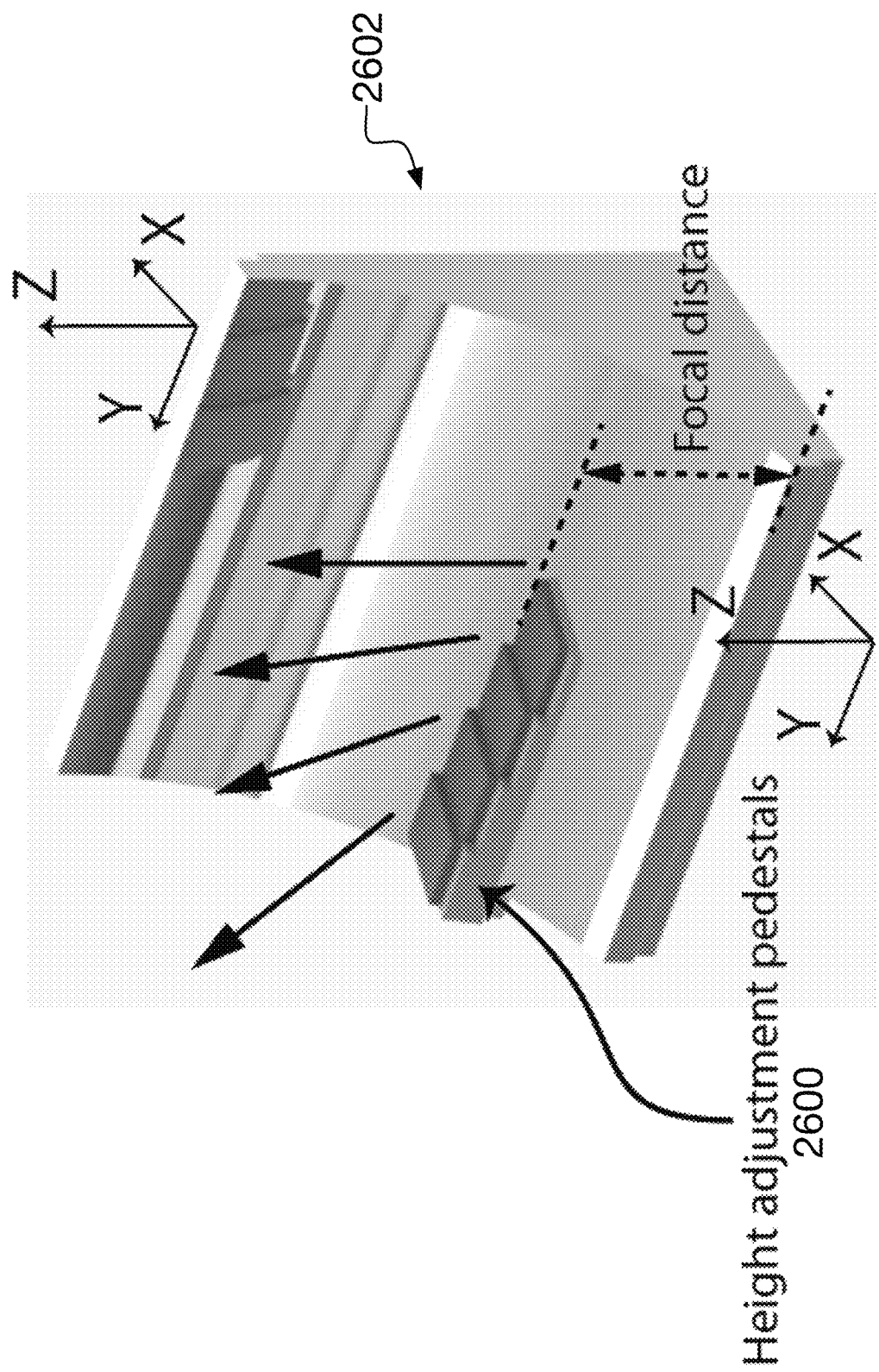
FIGS. 26A and 26B are schematic diagrams of example OPA chip arrangements on pedestals.

An optical beam emitted from an optical phased array within an OPA-based transceiver can be steered using reflective, dispersive, and/or refractive structures, for example. The same "steering" mechanisms can be used to configure the angle of reception for an incoming optical beam being received into the optical phased array. Some implementations utilize a secondary collimating or focusing device for changing the beam divergence of a beam. One example of such configuration is shown in FIG. 1. In this implementation, an OPA-based transceiver 100 includes a set of OPAs 102 that can be configured to utilize optical antennas that are, for example, end-fire antennas or short grating antennas (or other short antennas) for emitting/receiving a beam formed by interference over the linear array of antennas. In this example, each OPA 102 is on a separate chip. The emission angle of the outgoing beam 106A, and (the same) receiving angle of the incoming beam 106B, is steered in the X-Z plane (or equivalently, about the Y-axis) with phase control (i.e., controlling the relative phase shifts applied by phase shifters coupled to respective antennas). The beam from such an end fire (or short grating) antenna expands and fills a concave mirror 104. Since the ends of OPAs 102 are place at the focal distance 105 with respect to the mirror 104, the outgoing beam 106A exiting the mirror will be collimated rather than diverging in the Y-Z plane, as shown for the collimated beam 107 redirected from an illuminated spot 109 on the mirror 104. In this example, the steering in the Y-Z plane is performed by a steering element that is implemented using a dispersive element 110 such as a diffractive element (e.g., a diffractive surface element such as a diffraction grating) by changing the incident wavelength via laser tuning. For example, separate lasers (not shown) on each OPA 102, or a single laser (not shown) feeding light to all of the OPAs 102 can be used. Alternatively, the steering element can use an alternative steering mechanism such as liquid crystal, metasurface, polarization gratings, acousto-optic, a refractive element (e.g., a prism), and/or another kind of dispersive element. The OPA 102 for steering in the X-Z plane and the steering element for steering in the Y-Z plane can be combined to create a nonmechanical beam steerer covering the light cone in front of the transceiver 100 (with the center axis of the light cone in the Z direction). The field of view in the X-Z plane is determined by the single beam steering range of a single OPA 102. For example, a range of phase steering angles 108 are shown. Multiple OPAs 102 can be distributed at different locations on a set of pedestals 112 to extend the field of view (FOV) beyond what is possible by a single OPA 102, as described in more detail below for FIGS. 26A and 26B.

If the OPA-based transceiver 100 is used in a LiDAR sensor system, the backscattered light travels the same path in reverse and is collected by the same OPA 102, a neighboring Rx OPA (as described in more detail below for FIGS. 30A and 30B), or a neighboring transceiver. A concave (e.g., cylindrical) mirror 104 is chosen as the focusing optical element in this example since it can be configured to not introduce aberrations into the emitted outgoing beam 106A. However, the same may not be true for a cylindrical lens. An example analysis using Maxwell's equations demonstrates this point and is provided below. Optical phased arrays that rely on large surface-emitting apertures may suffer from aberrations caused by fabrication imperfections, which can limit the aperture size. These imperfections can be caused, for example, by a surface distortion (bow), layer thickness nonuniformity, or unequal phase accumulation along the imperfect waveguide.

Moreover, if the surface emission is achieved by long gratings, the direction of emission is highly wavelength dependent, which can be useful (e.g., in case of intentional steering with wavelength sweeps) or detrimental (e.g., in case of WDM data communication systems). In this example implementation, end fire (or short grating) antenna optical phased arrays coupled to external 1-D focusing/collimating optics are introduced to achieve a large effective aperture without requiring long antenna elements.

Figure 2A:
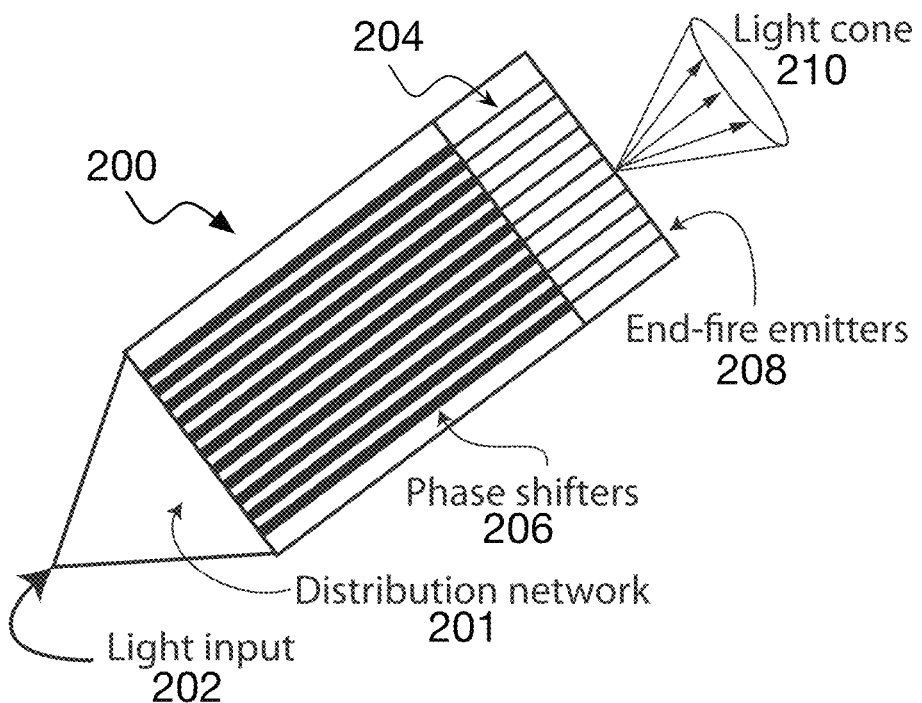
FIGS. 2A and 2B are schematic diagrams of an example OPA chip.

Referring to FIG. 2A, an OPA chip 200 includes a distribution network 201 (such as a waveguide tree or star coupler) deliver equal (or predetermined, such as Gaussian) distribution of optical field from a light input 202 to an array of waveguides 204. Individual phase shifters 206 (such as electrooptic, thermal, liquid crystal, pn junction based, etc.) can be coupled to respective waveguides 204 to control the phase of the light that is emitted from the end-fire emitters 208 at the ends of the array of waveguides 204.

Figure 2B:
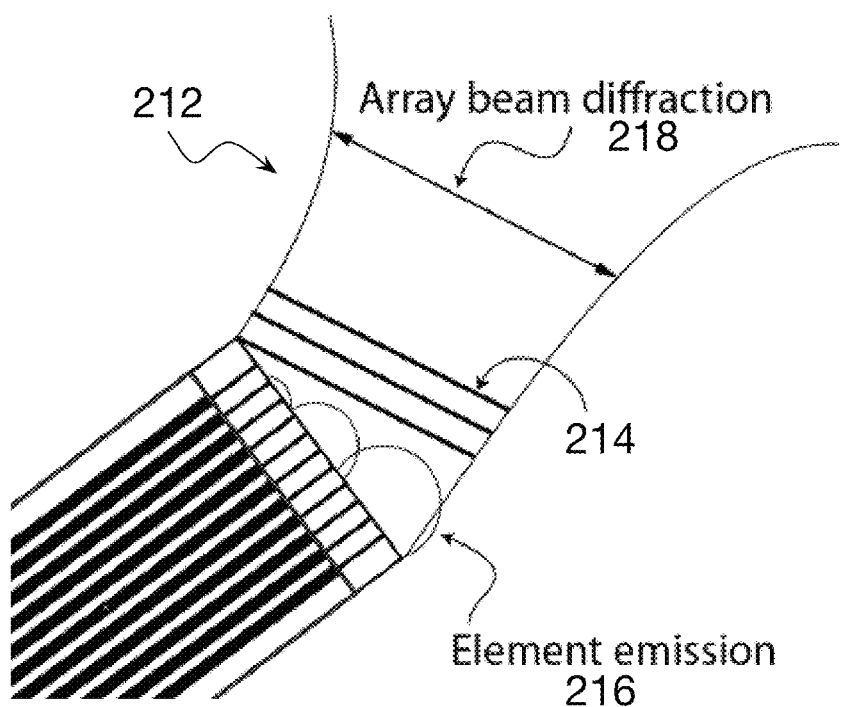

The light can be coupled into the light input 202 on the OPA chip 200 from a laser that is on or off the OPA chip 200. The light from each of emitters 208 passes through phase shifters 206 and emitters 208 and is emitted into a cone of light 210. Each emitter 208 creates its own element factor in both sideways and up-down directions. If the phase shifters 206 impart a linear progression of phase (which can be wrapped within 0-2π) to the light coming out of the emitters 208, the light from all emitters combine in an emitted beam 212 that has substantially flat phase fronts 214 (e.g., plane wave emission) in the plane of the OPA chip 200, as shown in FIG. 2B. As can be seen in FIG. 2B, which shows the top view of the optical phased array portion of the OPA chip 200 during operation, the beam 212 emitted from the optical phased array diffracts with a pattern determined by the width of the optical phase array (and the angel of observation). So, even though the light 216 emitted from each emitter expands quickly, the overall array beam diffraction 218 behaves like a slowly expanding semi-gaussian beam. Nevertheless, in the vertical direction the behavior of this planar array is not comparable to the in-plane view shown in FIG. 2B.

As can be seen in FIG. 3A, showing the cross section of the optical phased array viewed from the side, with a waveguide mode 300 corresponding to a core layer (e.g., silicon) within a cladding 302 (e.g., silicon dioxide) that is on top of a substrate 304 (e.g., a buried oxide (BOX) layer of a silicon-on-insulator (SOI) platform). The beam 306 emitted from the waveguide mode 300 undergoes expansion in the illustrated plane that is perpendicular to the linear array of emitters according to the expansion of a single emitter, and thus expands quickly in that plane. The rate of expansion, also measured by the mode cone angle, depends on the mode size. The beam expansion in the vertical direction of the illustrated plane depends on the effective aperture size of the end-fire emitter. In FIG. 3B, there is a small mode cross section 310 that leads to a rapid beam expansion 312. In FIG. 3C, there is a larger mode cross section 314 that leads to a slower beam expansion 316.

Figure 4A:
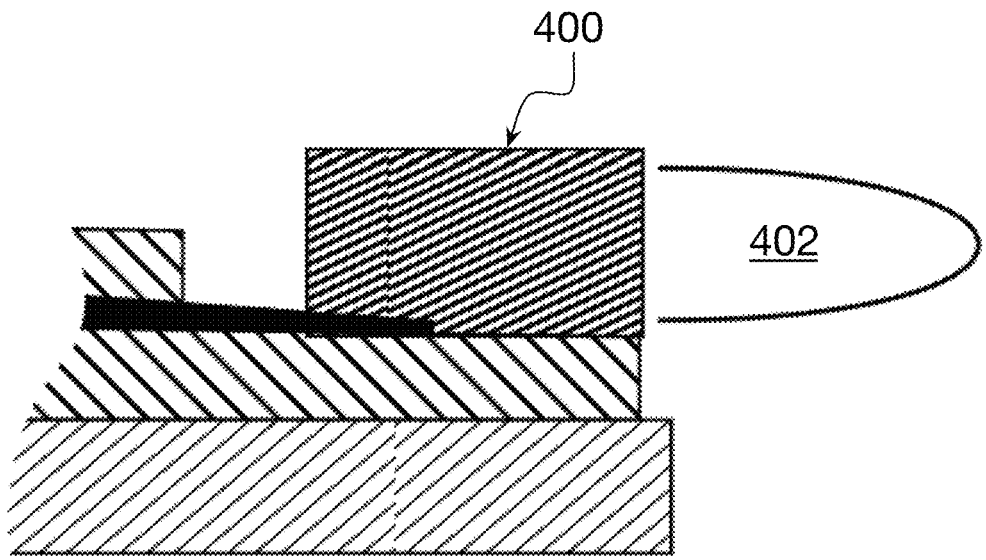
FIGS. 4A and 4B are schematic diagrams of structures for limiting beam expansion.
Figure 4B:
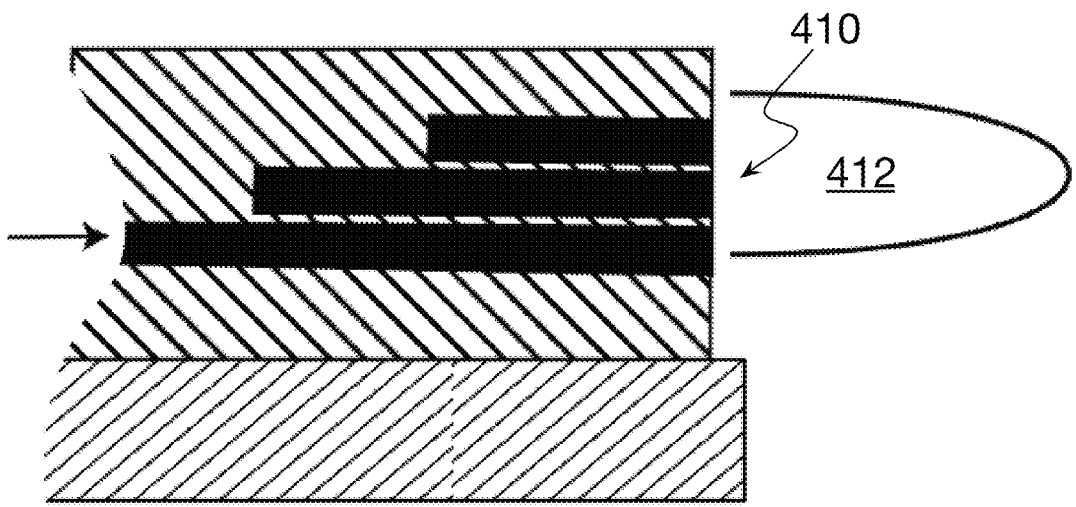
Figure 5:
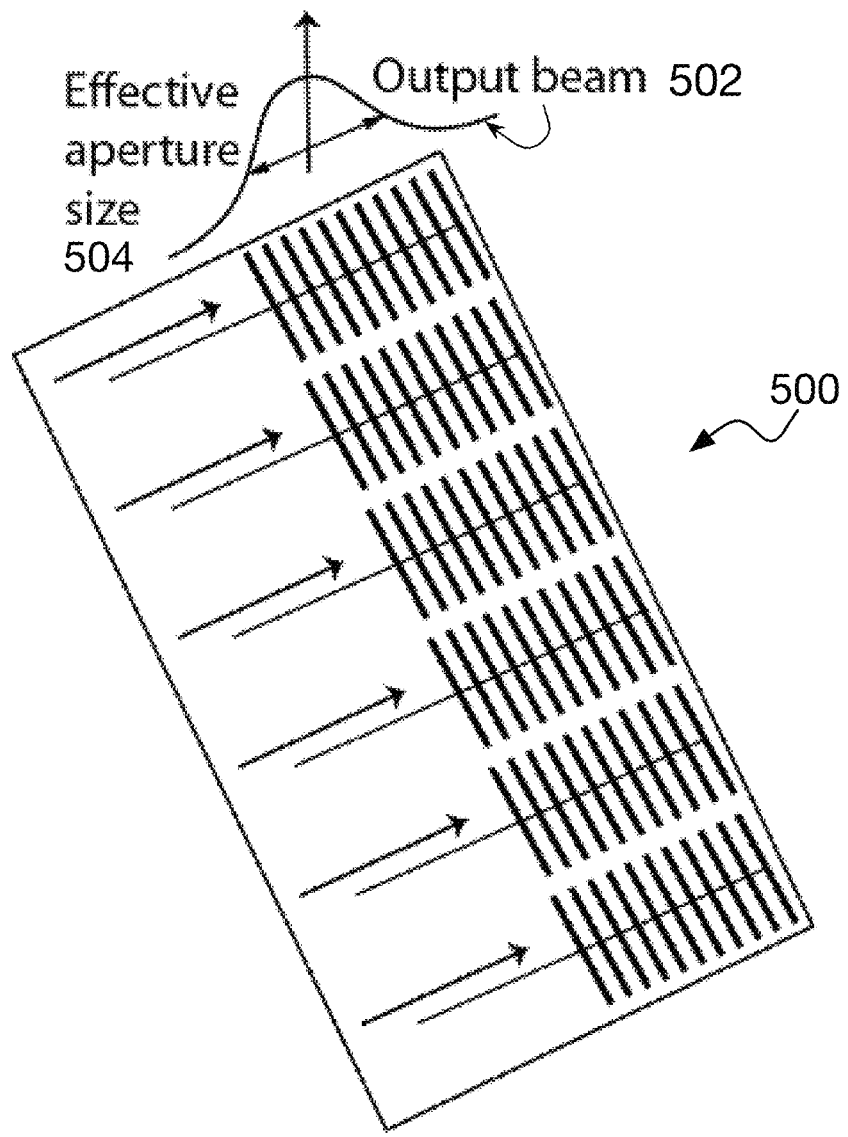
FIG. 5 is a schematic diagram of an array of grating emitters for limiting beam expansion.

The control of the mode and the associated beam expansion can be performed by any of a variety of techniques. FIG. 4A shows an example of coupling light to a low index loosely guiding structure 400 (e.g., a layer of polymer, silicon oxynitride, silicon nitride, etc.) to limit expansion of a beam 402, and FIG. 4B shows an example of coupling to multiple guiding layers 410 gradually to limit expansion of a beam 412. Another way to reduce the beam divergence, through an increased beam size, is utilizing a grating emitter. FIG. 5 shows an example of an array 500 of grating emitters that are configured to emit an output beam 502 in a direction out of the plane of the grating emitters. The strength of this grating coupler can be adjusted in a way that the total length of the emitters and the corresponding effective aperture size 504 is suited to the desired beam divergence angle.

The techniques described above can increase the effective aperture size from submicrometric scale to several micrometers. Nevertheless, the transverse mode size of the beam still expands much faster in the vertical direction (perpendicular to the array) than in the sideways direction (in the plane of the array). One way to overcome the overexpansion of the beam is utilizing a focusing element with colimiting power only in the desired plane.

Figure 6:
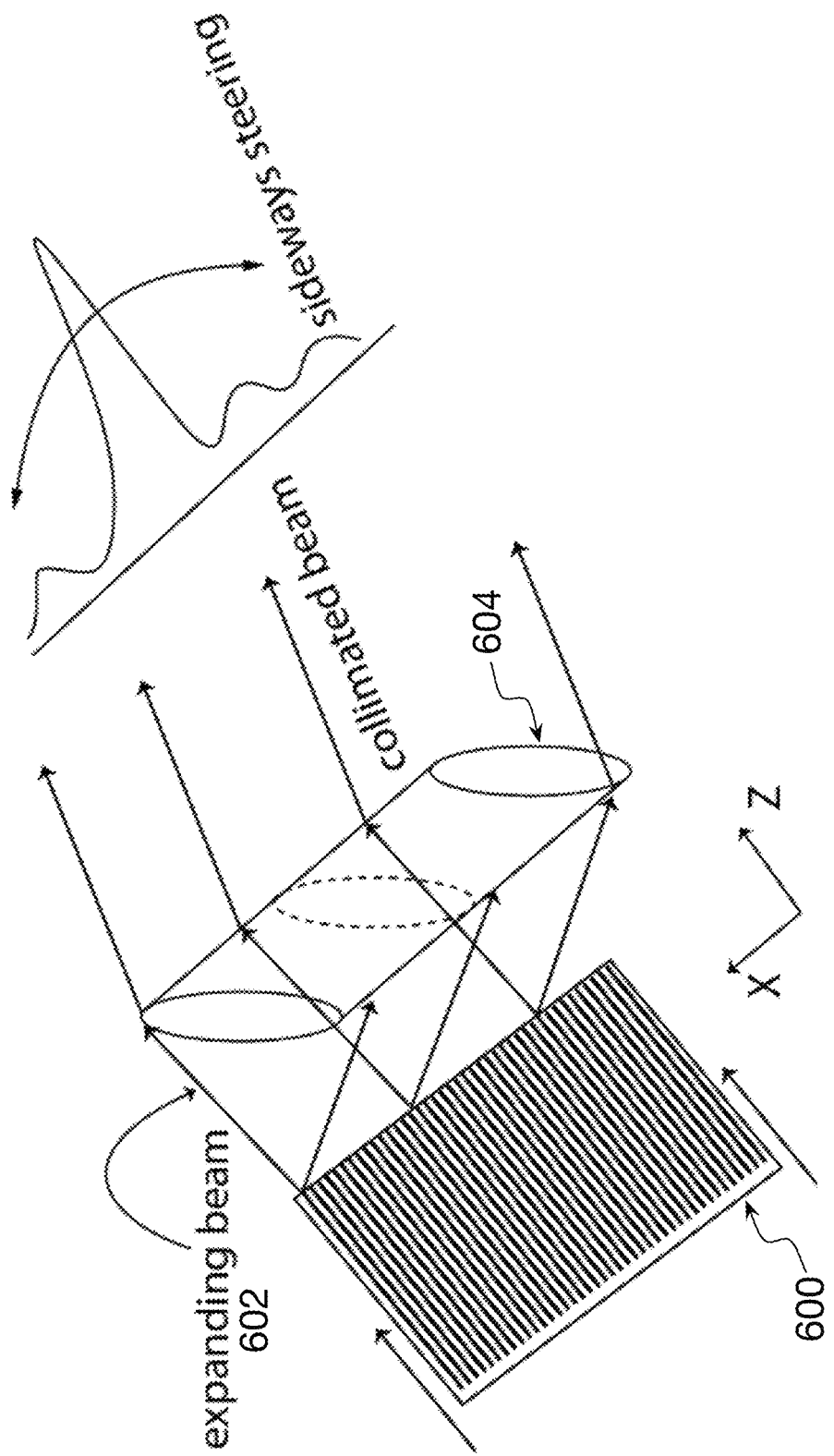
FIG. 6 is a schematic diagram of an OPA with a collimating lens.
Figure 7:
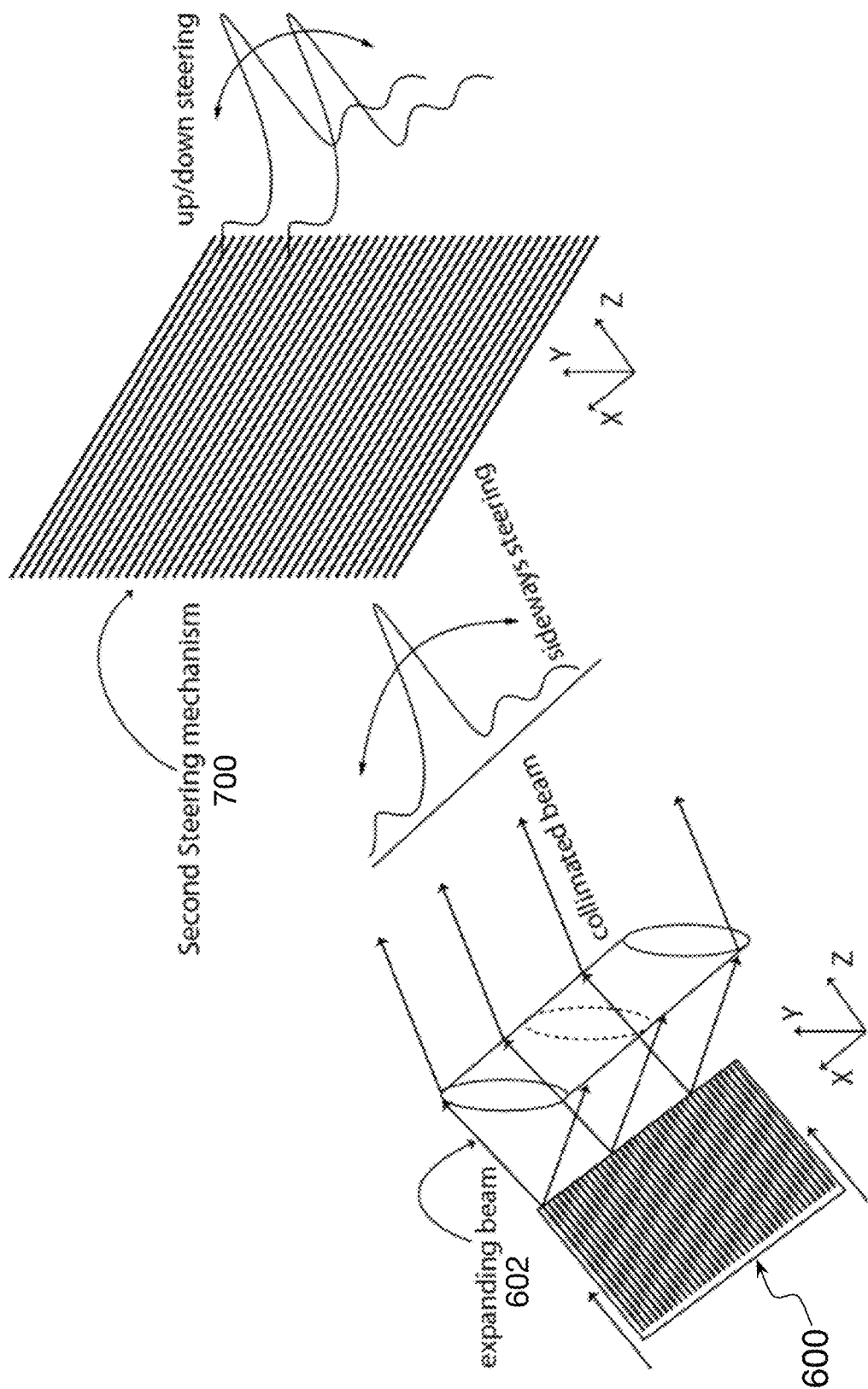
FIG. 7 is a schematic diagram of an OPA with a collimating lens and secondary steering mechanism.

As can be seen in FIG. 6, the light output from the edge of the end-facet emitters of an OPA 600 expands quickly and an expanding beam 602 fills up a cylindrical lens 604. The lens 604 has translational symmetry along the edge of the OPA 600, so the lens 604 has lower focusing power along that edge, which is appropriate since the beam 602 is slowly expanding in the XZ plane. In the vertical direction, the beam 602 is expanding more rapidly so the lens 604 has a focal length of f that is selected to collimate the beam 602 in the vertical direction. An observer from a distance larger that the Fraunhofer distance sees a field distribution that is the Fourier transform of the near field. The angular extent of the beam 602 in the far field in each direction depends on the aperture size in that direction. The effective aperture size in the sideways direction (X) depends on the optical phased array size and in the vertical direction (Y) depends on the size of the lens aperture and the percentage of the aperture filled with the expanding beam 602 from the end-facet emitters of the OPA 600. This configuration can only steer light with phase in one direction (i.e., "sideways steering" within the XZ plane). The steering in the second direction (about the X axis) can be achieved by a secondary steering mechanism. FIG. 7 shows an example of such a secondary steering mechanism. In this example, the secondary steering mechanism is provided by a dispersive element 700, which can be implemented as a liquid crystal, a polarization grating, an acousto-optic beam steerer, or other fast-steering electrically controlled mechanism that can steer the light in the up/down direction (about the X axis, or within the YZ plane).

Figure 8:
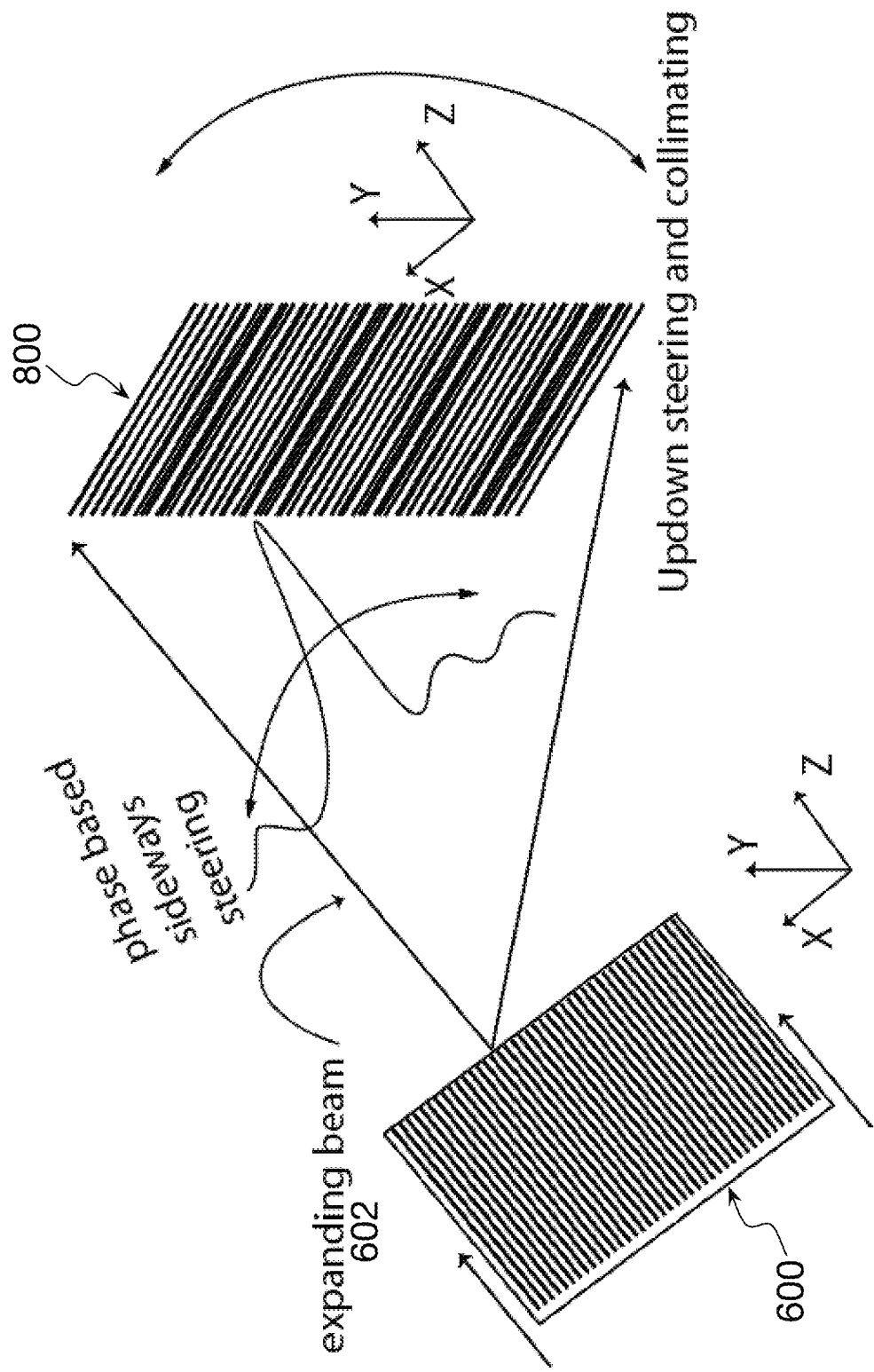
FIG. 8 is a schematic diagram of an OPA with a focusing steering element.
Figure 9:
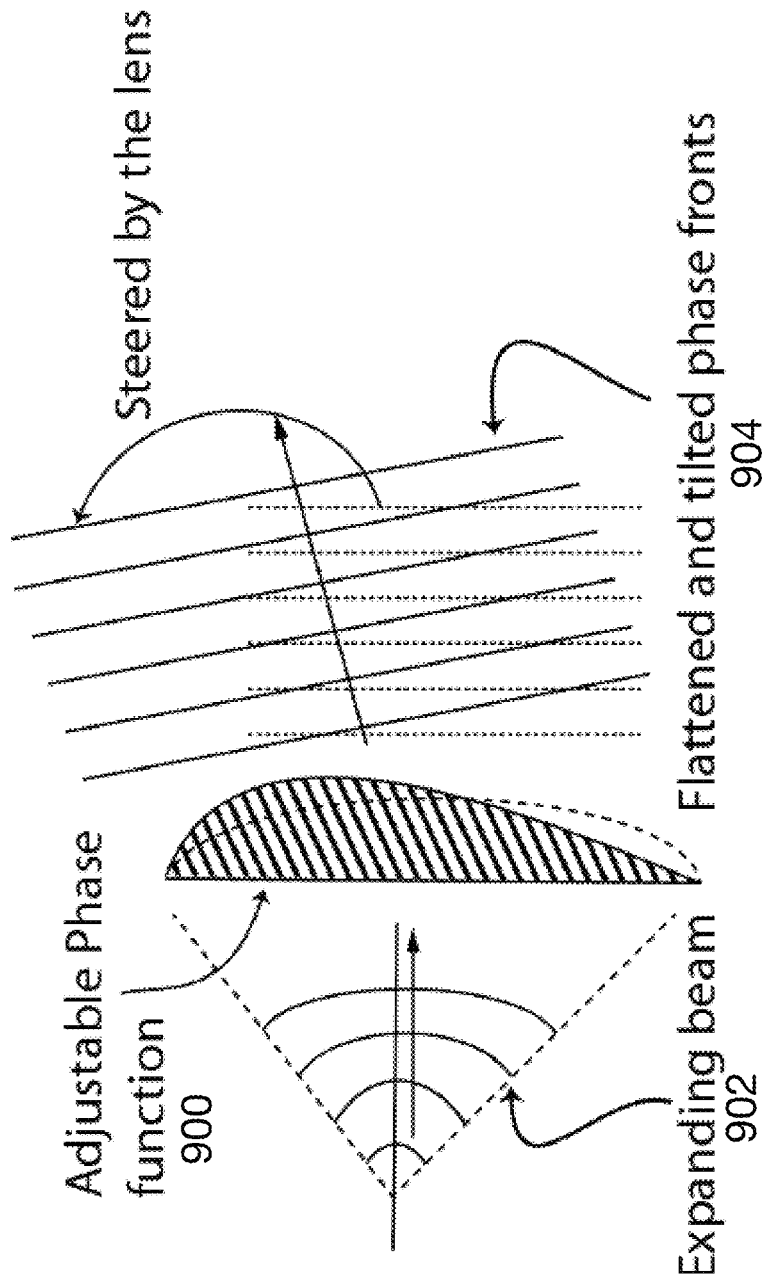
FIG. 9 is a schematic diagram of an element configured for flattening and tilting beam phase fronts.

Referring to FIG. 8, in some implementations, it is possible that the same diffractive/dispersive element can be configured as a focusing steering element 800 performing the steering in the vertical (YZ plane) direction and also providing focusing capabilities. Given an arbitrary phase function in the Y direction, the effective phase function of the focusing steering element 800 can be adjusted to both collimate and steer the light in the desired direction (e.g., in the Y direction in this example). As can be seen in FIG. 9, an element 900 can be configured to apply an adjustable phase function that acts on an expanding beam 902 to adjust the phase fronts of a beam 904 (e.g., flattened and tilted) to create plane waves with the required phase tilt to direct the beam in certain directions in the YZ plane. This can be performed, for example, by an element 900 implemented with a shape-changing lens (only in the YZ plane) or with a phase programmed plate.

Figure 10:
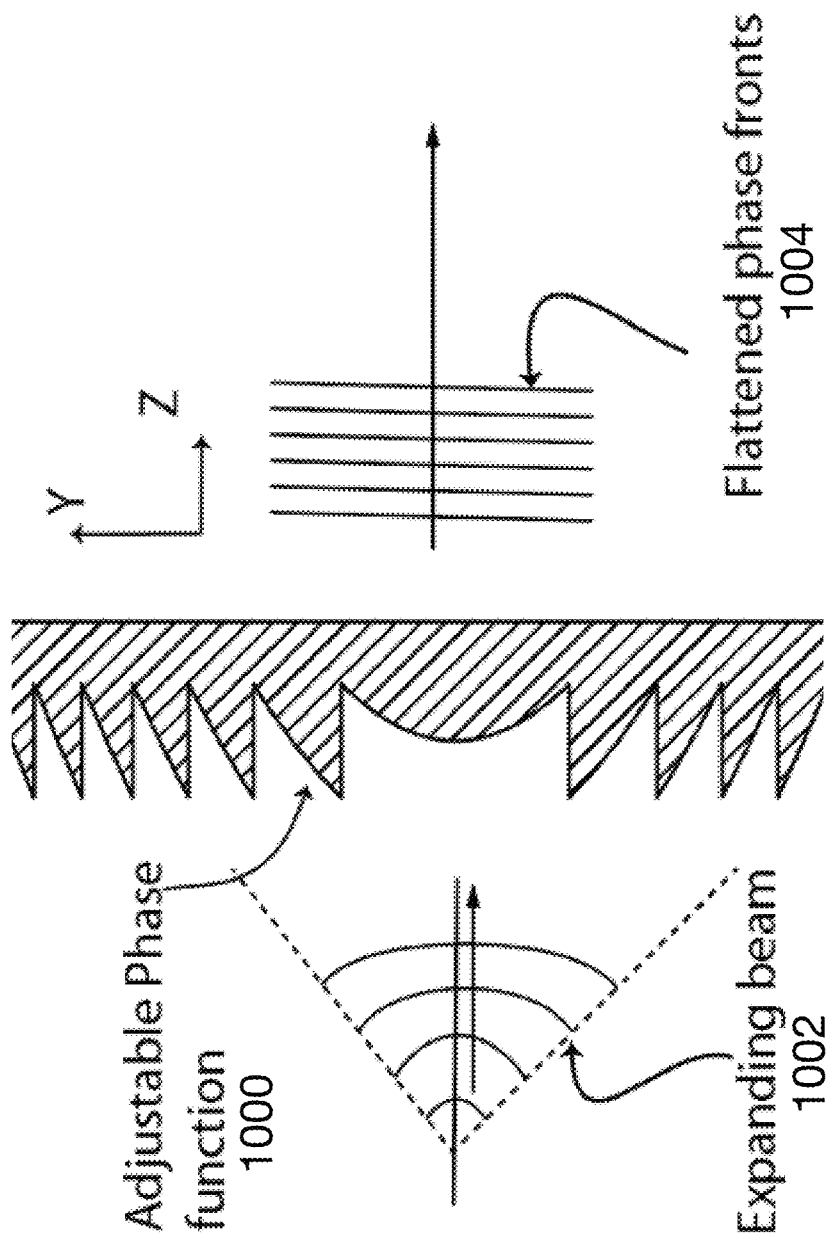
FIG. 10 is a schematic diagram of an element configured for flattening beam phase fronts.

Referring to FIG. 10, an element 1000 can be configured to apply an adjustable phase function that acts on an expanding beam 1002 as a tunable 3D cylindrical lens with arbitrary shape. For example, the phase function can be wrapped in a 0-2 pi range to implement a Fresnel lens) that provides a beam 1004 with flattened phase fronts. The element 1000 can be a diffractive/focusing element, such as a Fresnel lens with adjustable phase fronts, that can change both the expansion and the direction of the beam simultaneously.

Figure 11:
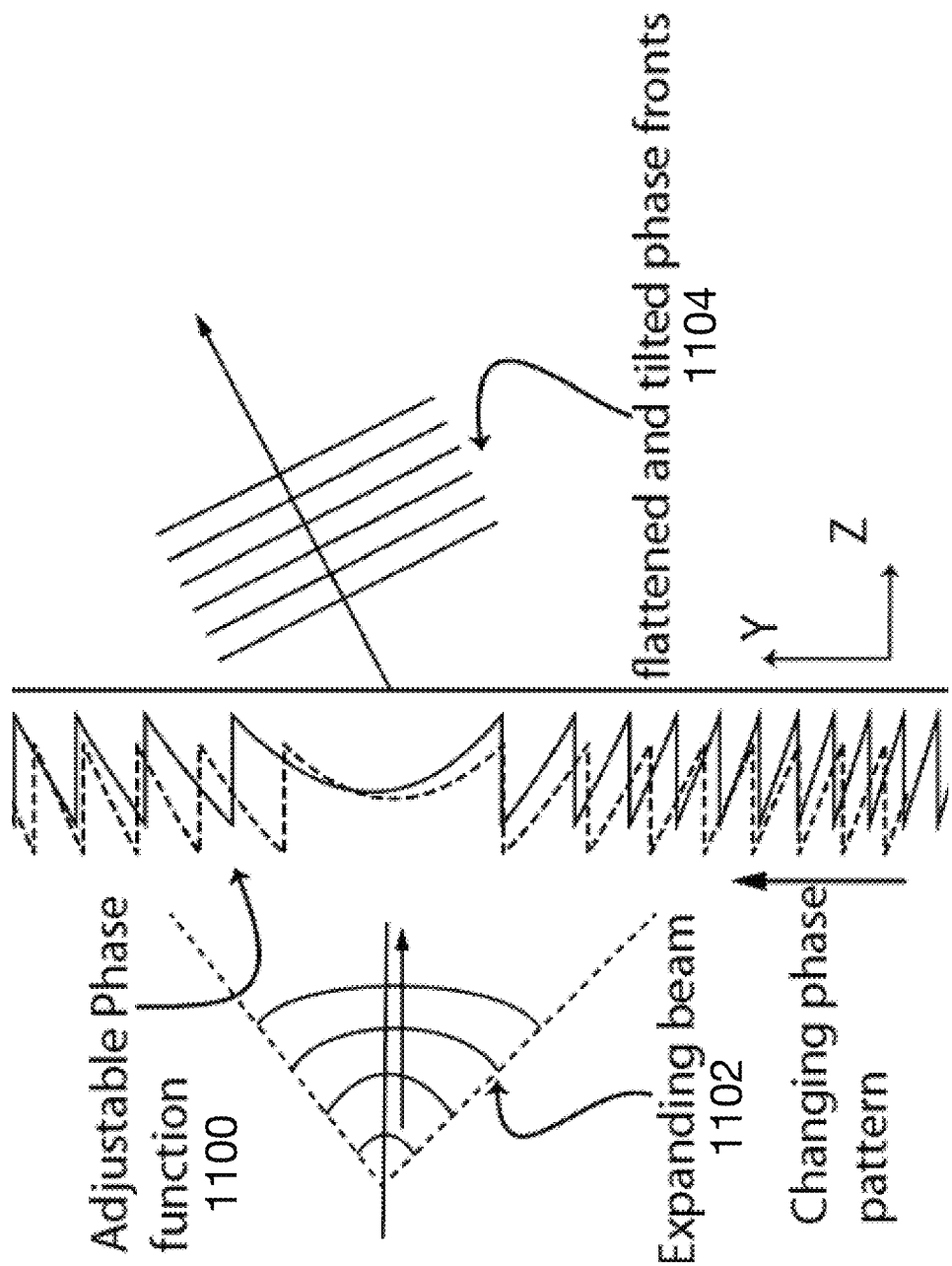
FIG. 11 is a schematic diagram of an element configured for flattening and tilting beam phase fronts.
Figure 12:
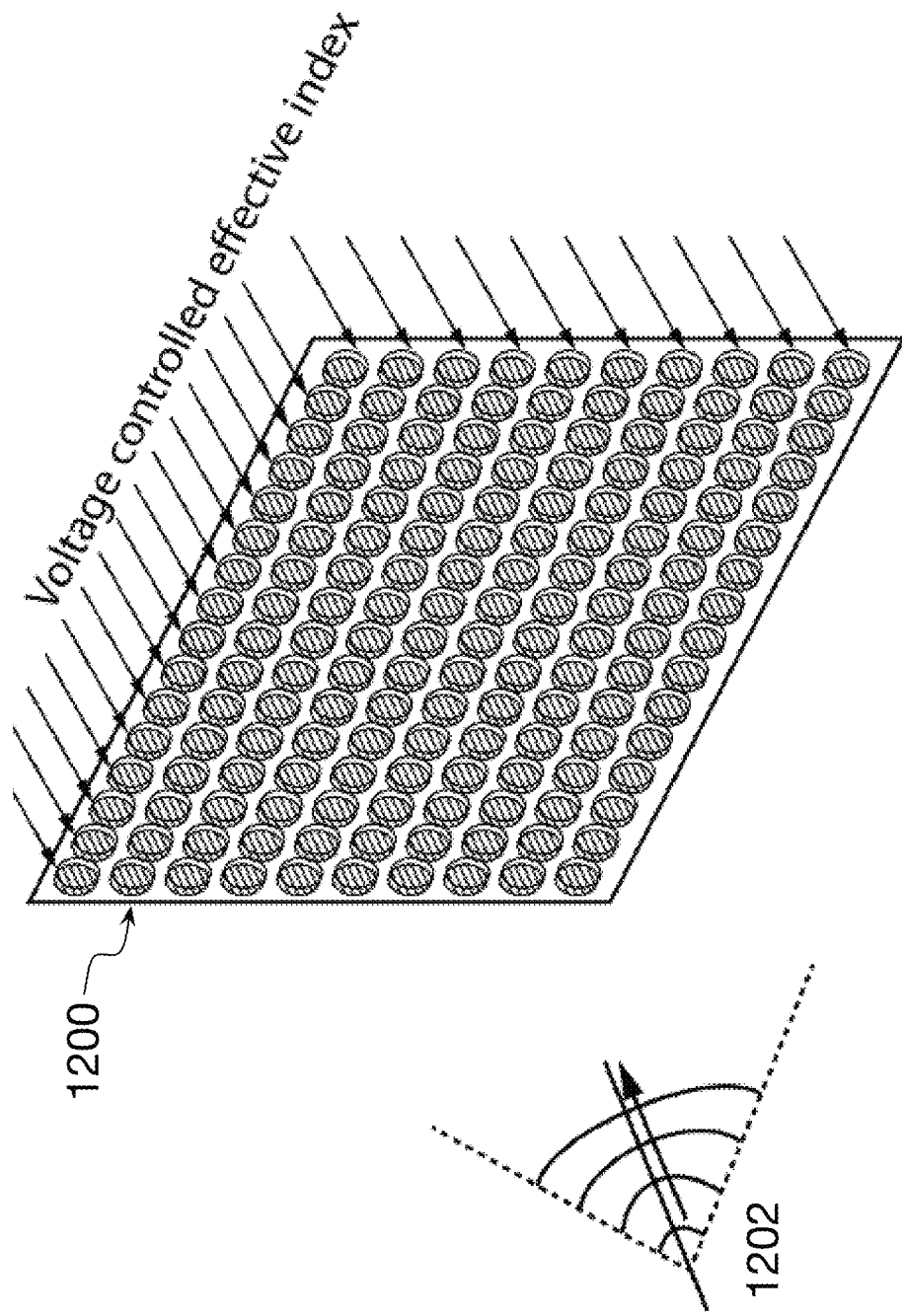
FIG. 12 is a schematic diagram of a phase plate structure.

Referring to FIG. 11, one example of a way to control the phase function at each point of an element 1100 is by providing small structures that change their effective index with electronic control. The element 1100 acting on an expanding beam 1102 provides a beam 1104 with flattened and tilted phase fronts. As an example of such index changing structures, pumping carriers to pn junction based resonant structures on a phase plate can create a 2D pattern of phase that can simultaneously collimate and steer the beam 1104. Referring to FIG. 12, a phase plate structure 1200 includes voltage controlled index changing elements in a 2D array that apply a voltage controlled effective index that changes at different points across the received phase front of an input beam 1202. The phase plate structure 1200 can also be coated with liquid crystals to increase the index change effect.

Figure 13A:
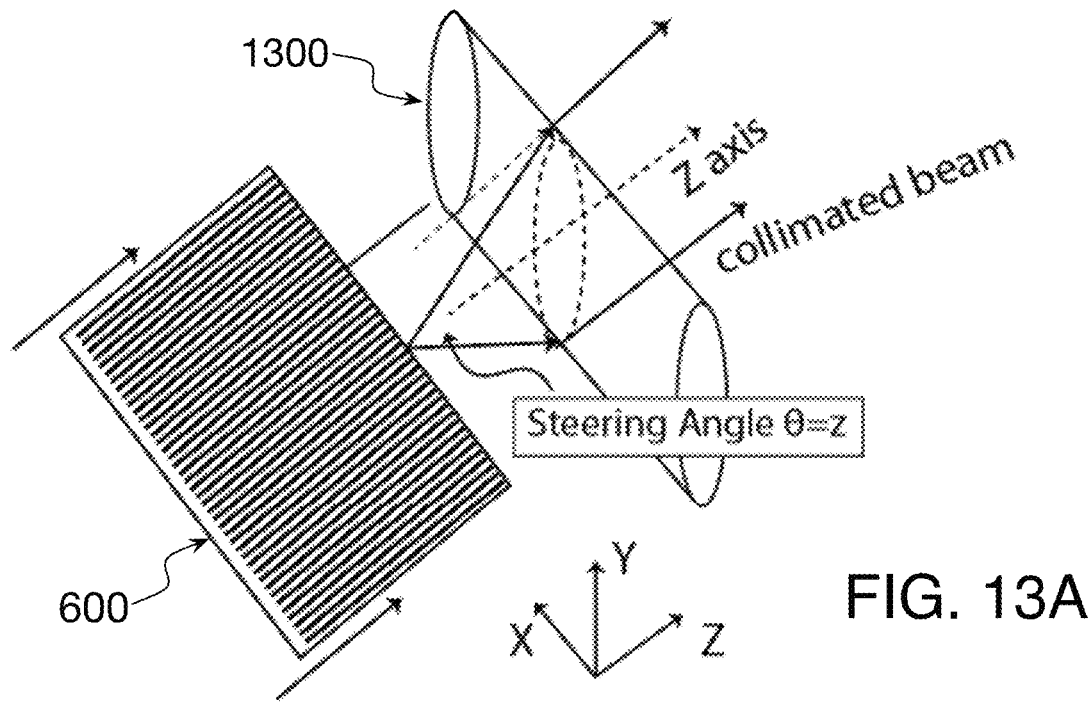
FIGS. 13A and 13B are schematic diagrams of example lens arrangements.
Figure 13B:
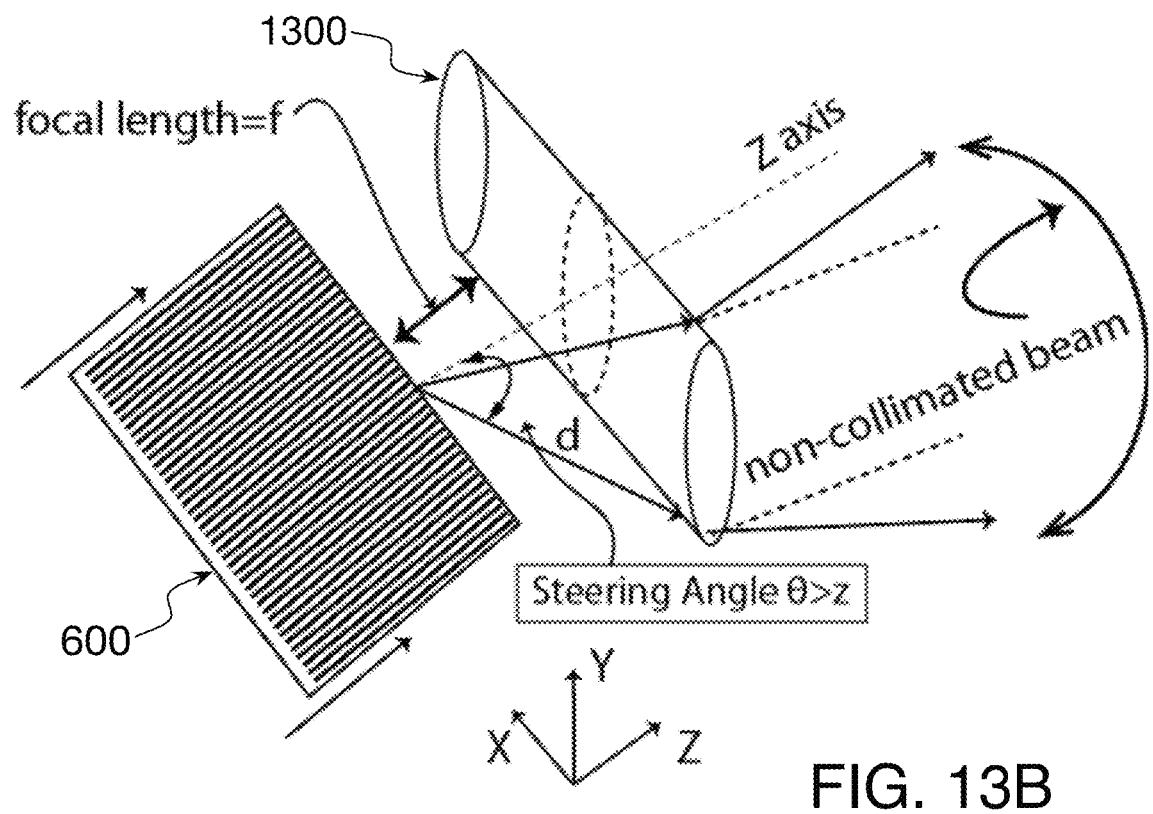

Referring to FIG. 13A, In one example of a thick cylindrical lens 1300, the associated lens function can be dependent on the angle of incidence. As can be seen in FIG. 13A, if the focal length of the lens for perpendicular incidence is f for collimating in the YZ plane, and the optical phased array output is placed at the focal point, the situation for phase-steered beams steered to an angle $\theta$ along the Z axis from the center of the OPA 600 (indicated by $\theta$=z) compared to an angle $\theta$ off of the Z axis (indicated by $\theta$>z) will be different. Referring to FIG. 13B, at the nonzero angle $\theta$ (relative to the YZ plane) the effective focal length of the lens (f($\theta$)) would be different than f, and also the distance the expanding beam travels to the lens (d) is longer than f. In this case, it is expected that f($\theta$) and d do not match and the OPA is not placed at the effective focal length of the lens. This leads to beams that are not collimated and diverge quickly before reaching a target in the distance. The amount of beam divergence can be tolerated if the target is at a short distance, but such a system may not be suitable for long range applications such as automotive lidar sensors or long-range free space optical links.

Figure 14A:
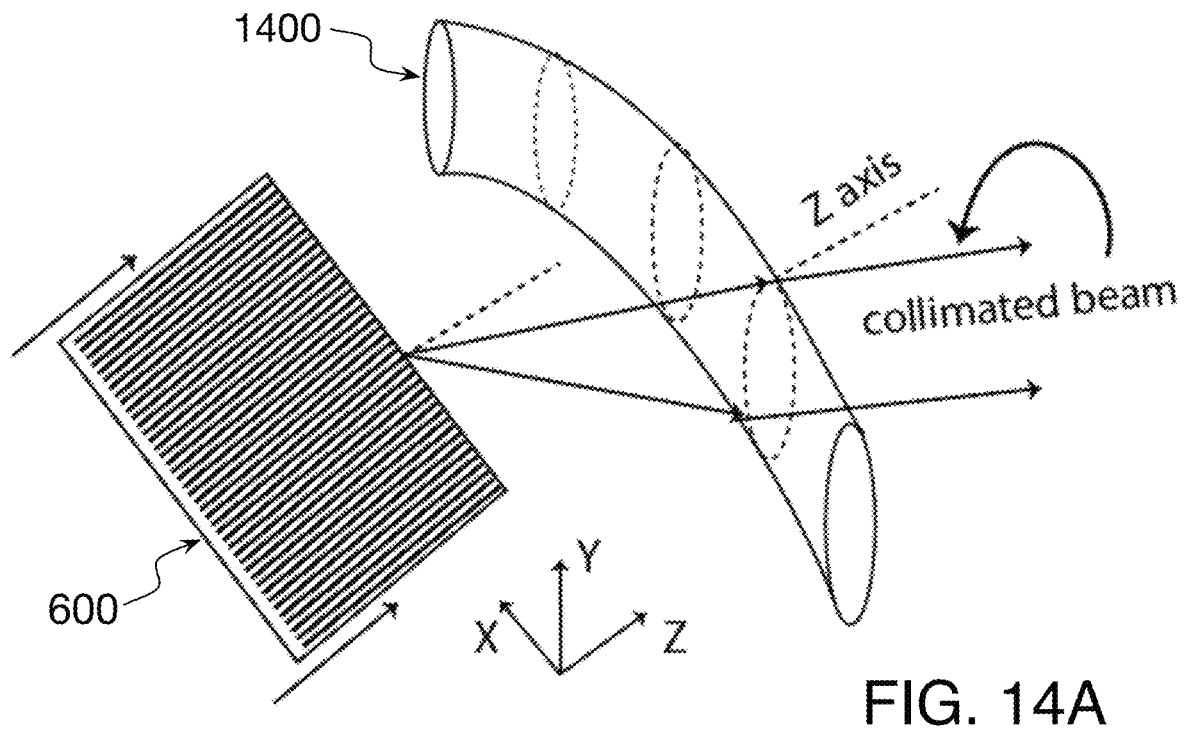
FIGS. 14A and 14B are schematic diagrams of example lens arrangements.
Figure 14B:
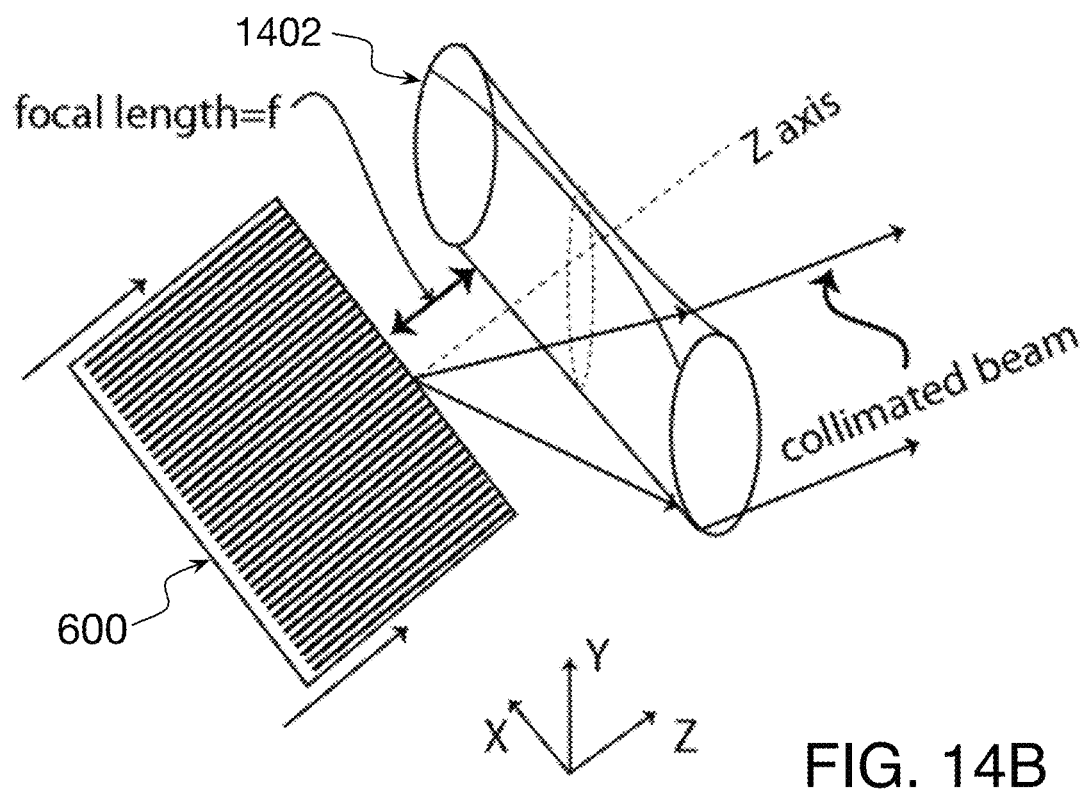

Referring to FIG. 14A, one way of alleviating the divergence at nonzero angle $\theta$ (as was shown in FIG. 13B) is to modify the lens design to a more complicated shape that compensates the angular beam expansion issues. For example, as can be seen in FIG. 14A, the center of the lens can be on a curve in the XZ plane such that the change in the distance is adjusted such that the distance d stays equal to the focal length f. Alternatively, referring to FIG. 14B, the strength of the lens represented by the effective focal length f($\theta$) can be modified for different incidence angles such that f($\theta$) and d remain substantially equal as $\theta$ and d change. For example, as can be seen in FIG. 14B, the focal curvature of the lens in the center can be different (e.g., smaller) than the focal curvature at the two ends changing the effective focal length a function of the angle. In other implementations, the two approaches above can be combined in a lens in which both its strength and center point change with angle.

Figure 15:
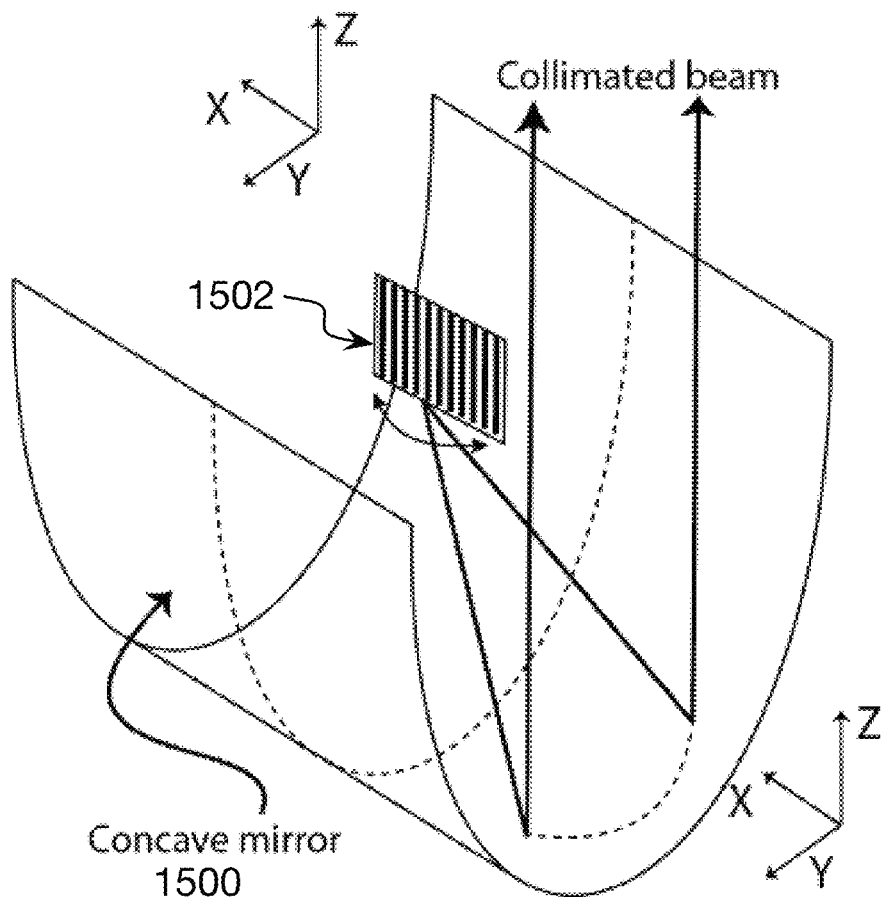
FIG. 15 is a schematic diagram of a curved mirror used as a focusing element.
Figure 16A:
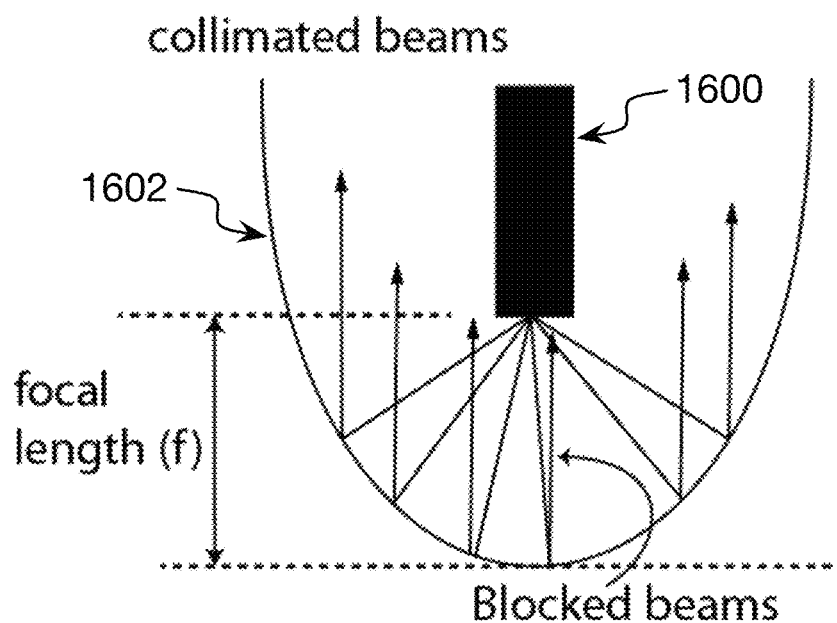
FIGS. 16A, 16B, and 16C are schematic diagrams of light rays for a curved mirror used as a focusing element.

Referring to FIG. 15, another method of achieving collimation for a beam that is expanding in the YZ plane is utilizing a curved mirror 1500 as a focusing element for a beam from an OPA 1502. The mirror 1500 has a curved concave profile in the YZ plane and is uniform over its length along the X direction. As can be seen in FIG. 16A, an OPA chip 1600 can be placed in front (i.e., inside) of a concave mirror 1602 such that the emitters are located approximately at the focal point of the mirror 1602. The relative phases applied to the OPA chip 1600 can steer the beam along the X direction (i.e., in the XZ plane about the Y axis) while the beam expands in the Y direction (i.e., in the YZ plane) coming out of the chips. The mirror can be a parabolic ($z=4fy^2$) with a focal length of f. The beam portions (also called rays, or simply "beams") coming out of the OPA chip 1600 are all collimated along the Z direction. Since, in this example, the OPA chip 1600 is placed in the center of the mirror 1602 illuminating downwards toward the center of the mirror 1602, a portion of the back-reflected light is blocked by the OPA chip 1600 leading to loss.

Figure 16B:
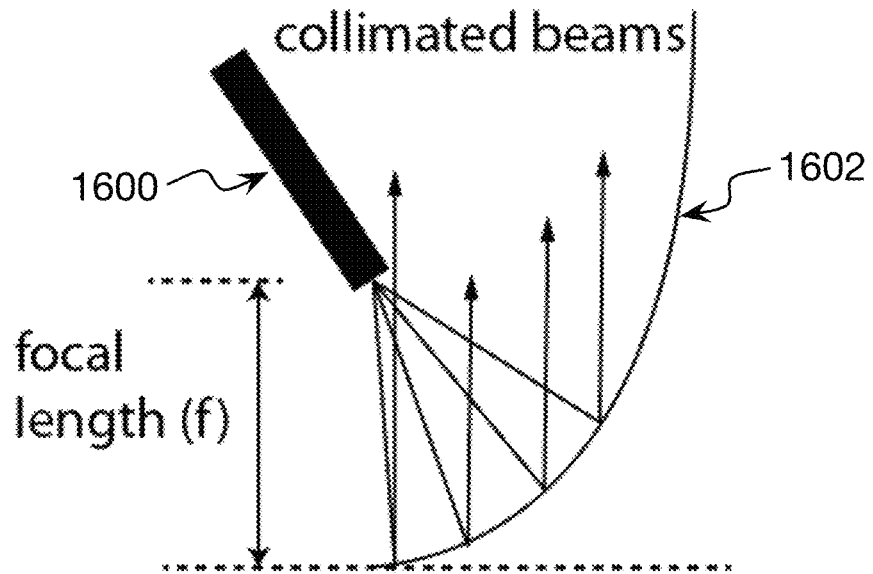
Figure 16C:
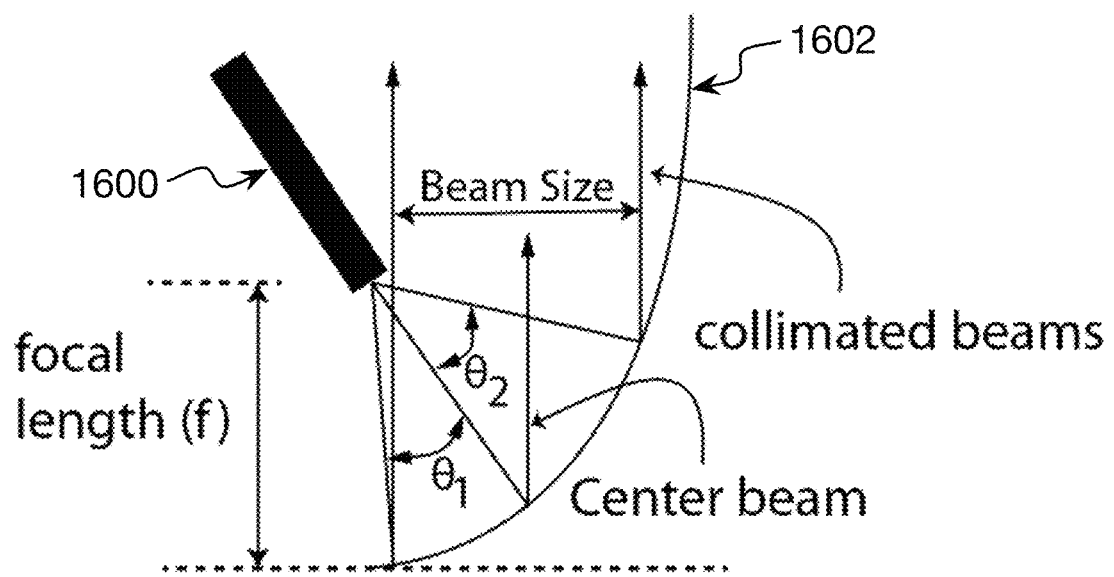

One solution to the light loss due to the blockage by the OPA chip 1600 is to have the OPA chip 1600 illuminate the mirror 1602 at an angle. For example, as can be seen in FIG. 16B, if the facet of the OPA chip 1600 remains at the focal point and the orientation of the OPA chip 1600 changes so that only the right side of the mirror 1602 is illuminated, no optical blockage will occur. The size of the collimated beam coming out of the system depends on the focal length, the beam divergence out of the OPA chip 1600 and the orientation of the OPA chip 1600. For example, referring to FIG. 16C, if the light cone extent out of the OPA chip 1600 is $\theta_1$ and $\theta_2$, the orientation angle of the optical phased array ($\theta_0$) should be larger than $\theta_1$ and the beam size depends on f, $\theta_0$, $\theta_1$, and $\theta_2$.

Figure 17B:
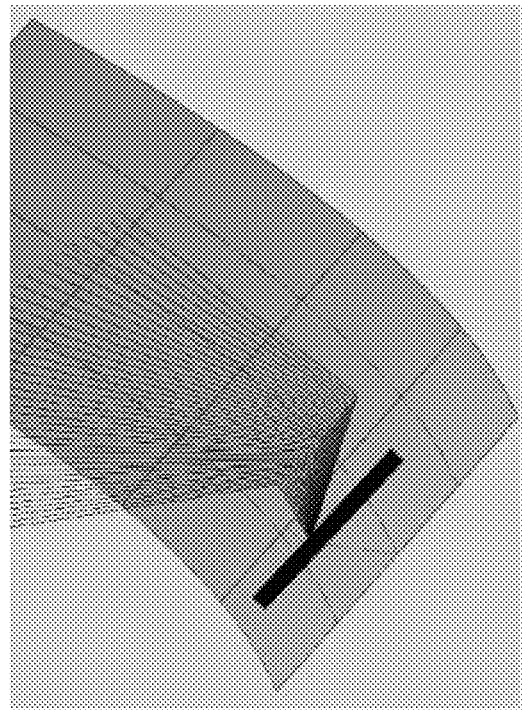
FIGS. 17A and 17B are sketches of beam expansion.
Figure 17A:
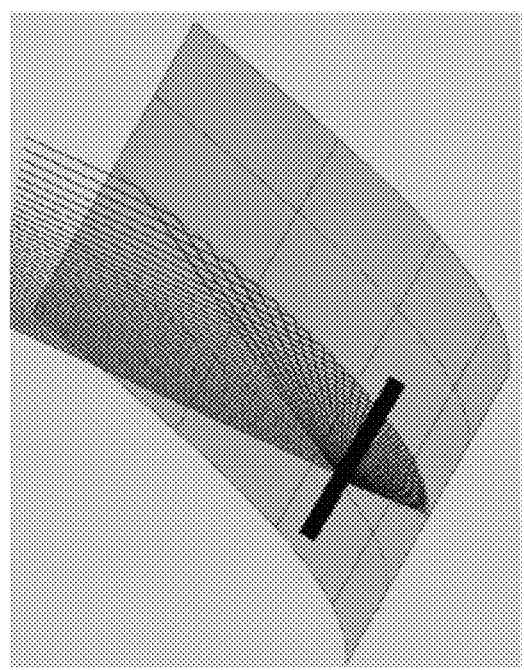

The size of a curved mirror used as a focusing element should be large enough to accommodate the steered beam (in X direction, also called length here) and also the beam expansion in the YZ direction (mirror's width). As an example, FIGS. 17A and 17B show a representation of beam expansion in which the width of the mirror is four times its focal length (W>4f) (as shown in FIG. 17A), and its length is 10 times its focal length (L>10f) (as shown in FIG. 17B). This example covers approximately ±60 degrees in both directions, in addition to the steering angle. The exact minimum size depends on the beam divergence and the required steering range.

Figure 18A:
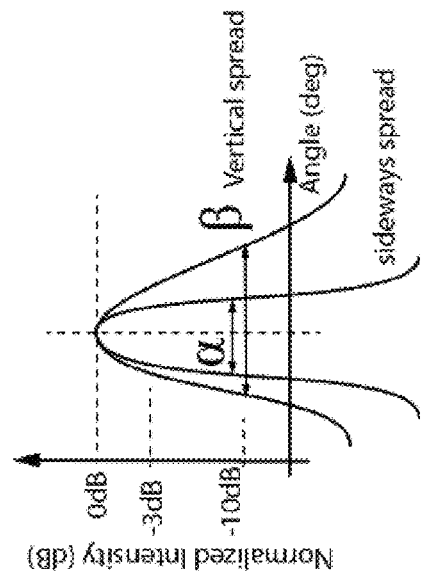
FIGS. 18A, 18B, and 18C are schematic diagrams representing characteristics of an end-fire waveguide example.
Figure 18B:
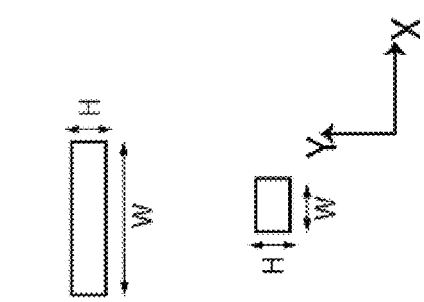
Figure 18C:
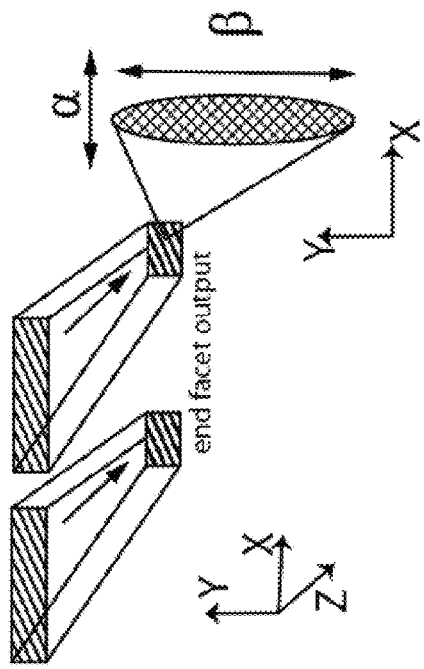

FIGS. 18A-18C show an example of the beam divergence out of end-fire waveguides that can be used in an OPA. FIG. 18A illustrates the different measures of a beam's divergence in each direction, which can be defined as the full beam angle between the points at which beam intensity drops below −10 dB from the peak beam intensity. As can be seen in FIG. 18A, α and β are the beam's 10 dB cone angles in the sideways (X) and vertical (Y) directions, respectively. Referring to FIG. 18B, the width (W) and height (H) of the waveguides are shown for a full-width portion and a tapered end-facet portion. In this example, the waveguides are tapered from a wide cross section to a narrower one (with the width W reduced and the height H staying the same). If the height of the waveguide stays smaller than its width at the end-facet, the output beam diverges faster in the Y direction. As shown in FIG. 18C, a smaller waveguide height leads to β being larger than α.

Figure 19:
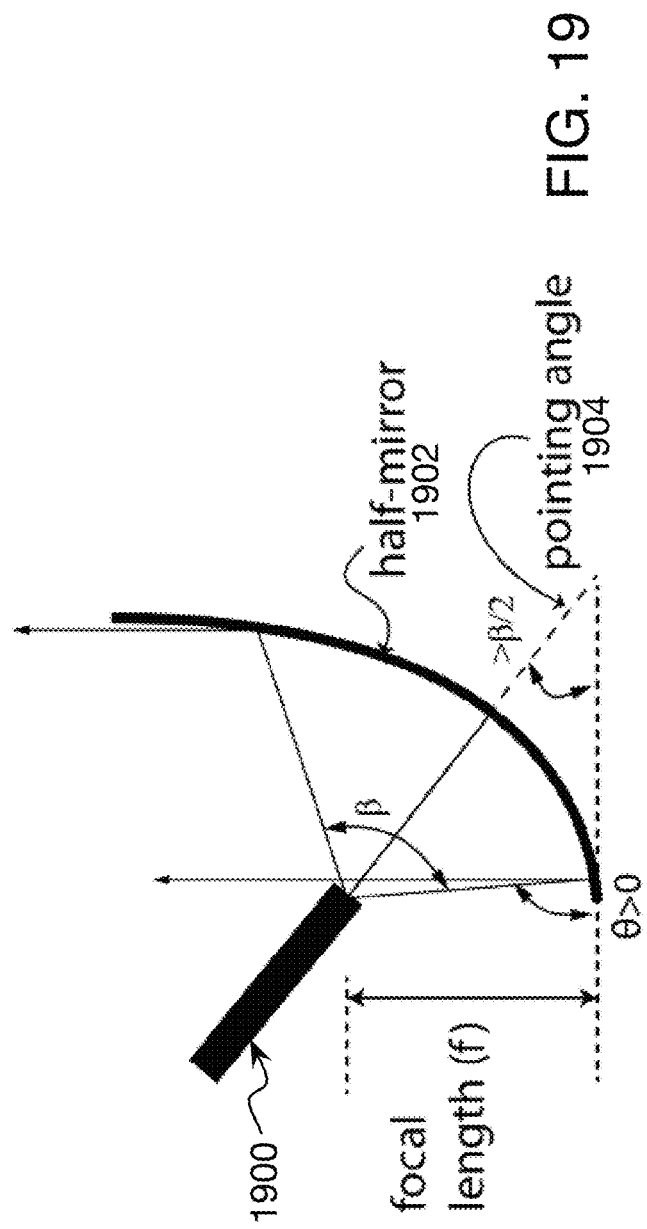
FIG. 19 is a schematic diagram of a half-mirror example.

FIG. 19 shows an example of an OPA chip 1900 providing a beam to a half-mirror 1902. In this example, the pointing angle 1904 is larger than β/2. This leads to the any beam blockage happening by the OPA chip 1900 being limited to below −10 dB in intensity. The pointing angle 1904 can be increased even more for less and less beam blockage, but the mirror width on the right should be increased as the light cone moves to the right of the half-mirror 1902. In other words, there is a trade-off between a larger beam size and a more compact device size.

Figure 20:
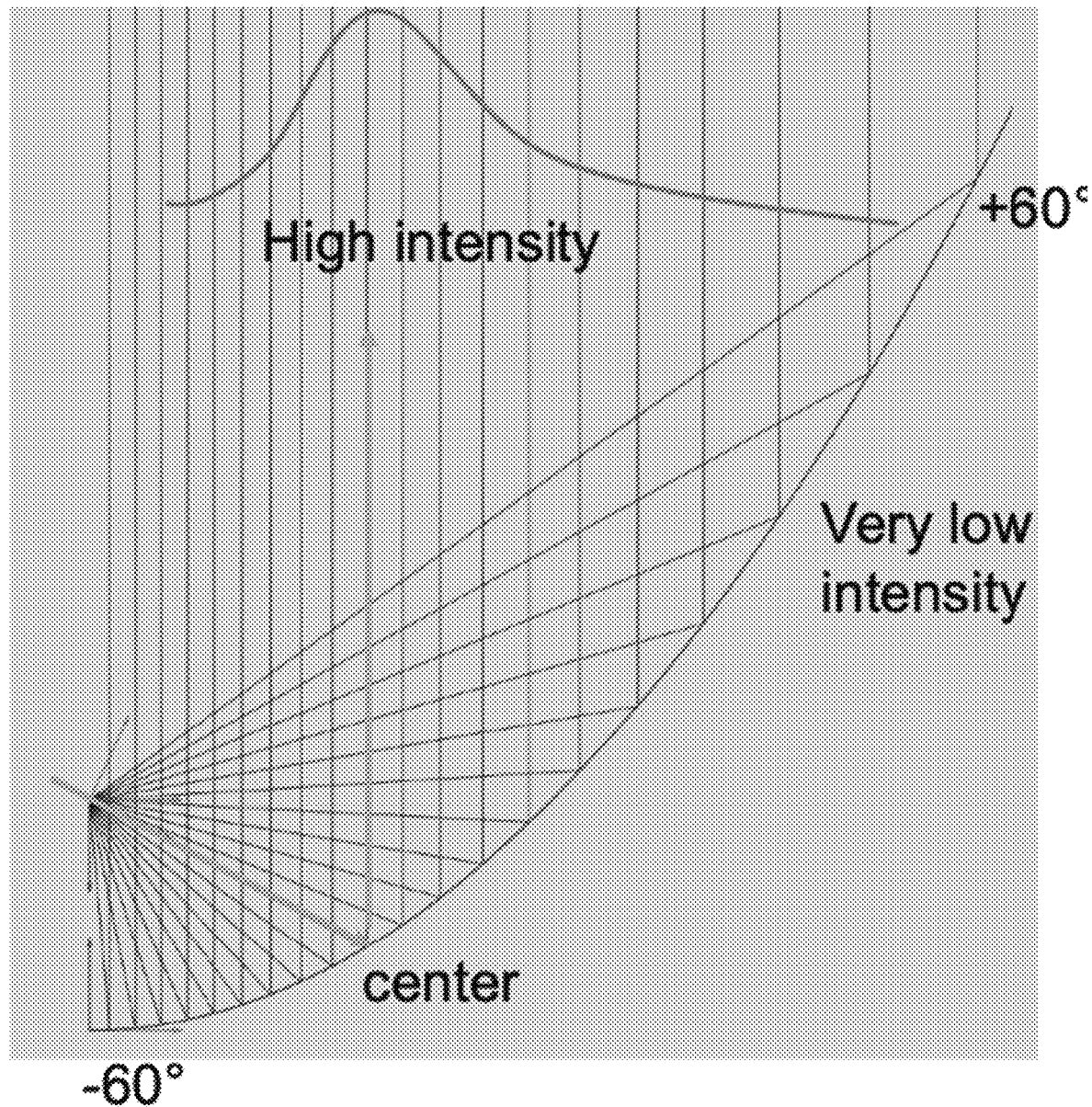
FIG. 20 is a sketch of rays associated with a half-mirror example.

FIG. 20 shows the ray tracing of an array of beams coming out of an OPA chip with a light cone of ±60° for a half-mirror configuration as in FIG. 19. The OPA chip is tilted to 65°. As can be seen from the rays, the right half of the beam is spread more because of this tilt and occupies a much larger area on the mirror. Consequently, the beam coming out of the half-mirror system will be asymmetrical with more Y spread on the right side of the beam.

Another consideration is the beam collimation (Y spread) as the optical phased array steers the optical beam along the X (length) direction. As was shown in FIGS. 13A and 13B, if a regular cylindrical lens is utilized to collimate the beam in the Y direction, the steering along X causes the outgoing beam to become out of focus and diverging. It can be shown that a beam steered along the X direction and collimated with a parabolic mirror does not suffer such aberration (defocusing) problems.

Figure 21:
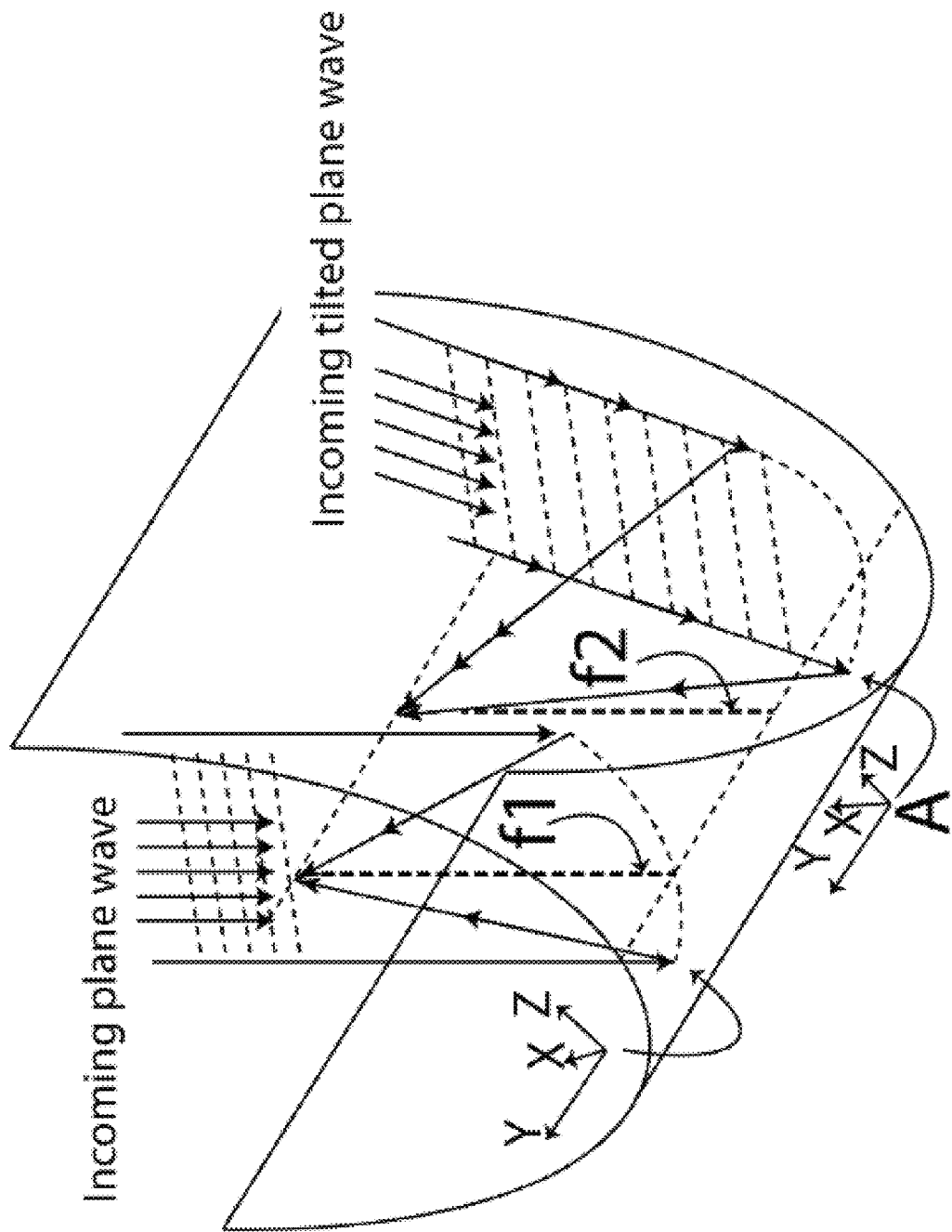
FIG. 21 is a schematic diagram of plane waves being focused by a cylindrical mirror.
Figure 22:
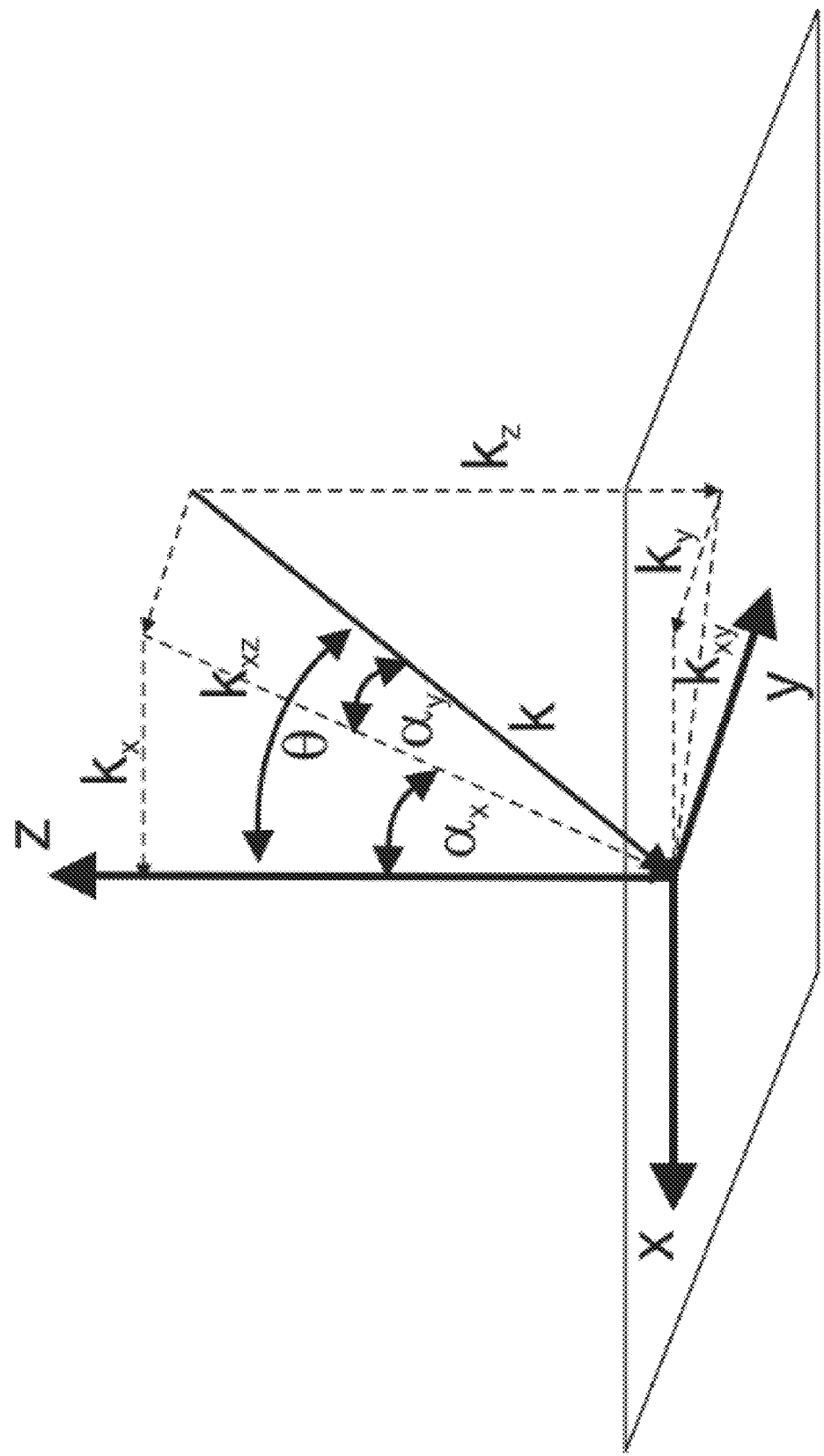
FIG. 22 is a schematic diagram of wavevectors associated with the example of FIG. 21.

FIG. 21 shows an example of a cylindrical mirror focusing incoming plane waves. The possible defocusing issue can be investigated by comparing the focal distance of a straight down incoming plane wave (f1) with the focal distance of a plane wave tilted along the length of the mirror (f2) which is along Y in this example. For the plane wave hitting the point A in FIG. 21, the associated wavevector k is shown in FIG. 22. The relevant components of the wavevector are related as follows.

$$k_{xy_i} = k_{xy_r}$$

$$k \sin \theta_i = k \sin \theta_r$$

$$\theta_i = \theta_r$$

$$k_{x_i} = k_{x_r}$$

$$k_{y_i} = k_{y_r}$$

And, by way of example, without being bound by theory, from the wave equation, we have the dispersion relation.

$$k^2 = k_x^2 + k_y^2 + k_z^2$$

And, therefore, the following condition holds.

$$|k_{z_i}| = |k_{z_r}|$$

And the angle is related as follows.

$$\alpha_{x_i} = \alpha_{x_r}$$

And, therefore, the focal point location along the x-axis is only a function of the x-component of the input angle $\alpha_{x_i}$ and not a function of the y-axis input angle $\alpha_{y_i}$.

The following are examples of wavevector component relationships for a cylindrical lens example.

$$k_{xy_i} = k_{xy_t}$$

$$k_i \sin \theta_i = k_t \sin \theta_t$$

$$k_{x_i} = k_{x_t}$$

$$k_i \cos \alpha_{y_i} \sin \alpha_{x_i} = k_t \cos \alpha_{y_t} \sin \alpha_{x_t}$$

$$k_{y_i} = k_{y_t}$$

$$k_i \sin \alpha_{y_i} \cos \alpha_{x_i} = k_i \sin \alpha_{y_i} \cos \alpha_{x_i}$$

$$\sin \alpha_{x_t} = \frac{k_i \cos \alpha_{y_i}}{k_t \cos \alpha_{y_t}} \sin \alpha_{x_i}$$

Therefore, the angle of refraction along the x-axis is a function of the angle of incidence along the y-axis. And, therefore the focal point location along the x-axis is affected by the y-component of the input angle $\alpha_{y_i}$. And, therefore, a cylindrical lens does introduce aberrations in the focused beam.

Figure 23:
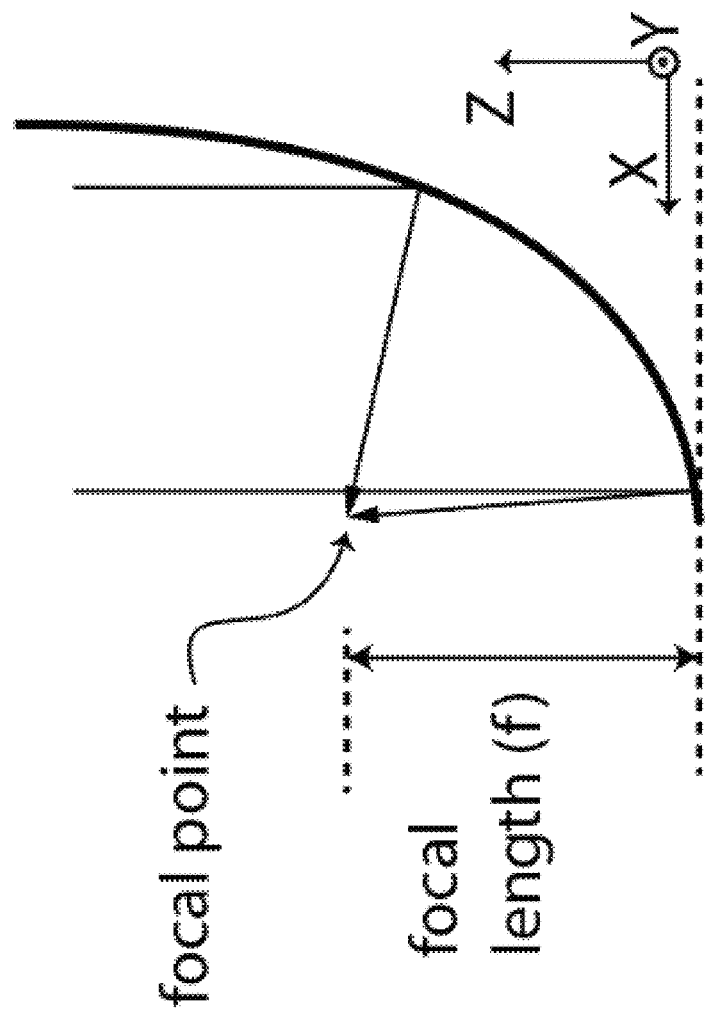
FIG. 23 is a schematic diagram of a focal point for a beam shining in a downward direction.
Figure 24:
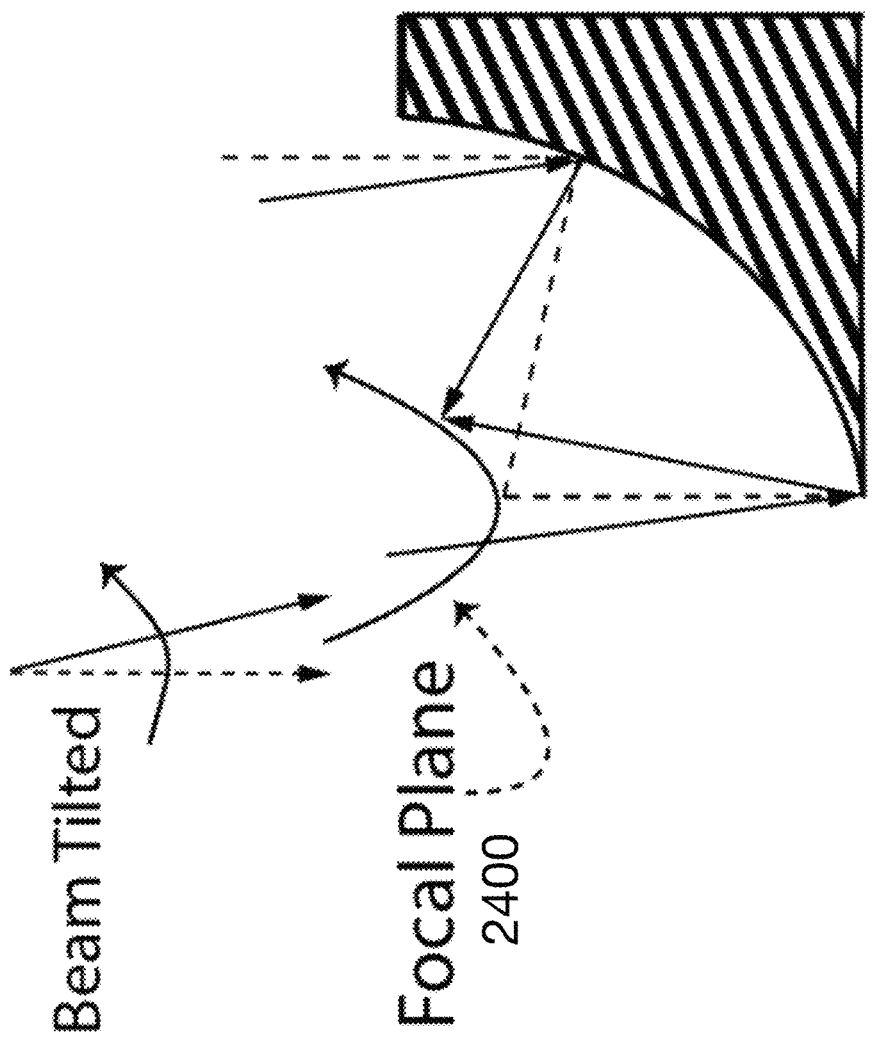
FIG. 24 is a schematic diagram of a focal plan curve for the example of FIG. 23.

As can be seen in FIG. 23, when a beam is shined onto the mirror straight down along the Z axis, the beam focuses onto the focal point of parabola in the center of the mirror. As shown in FIG. 24, when the beam is tilted along the X axis, the focal point of the beam moves in both X and Z directions on the focal plane curve 2400.

Figure 25:
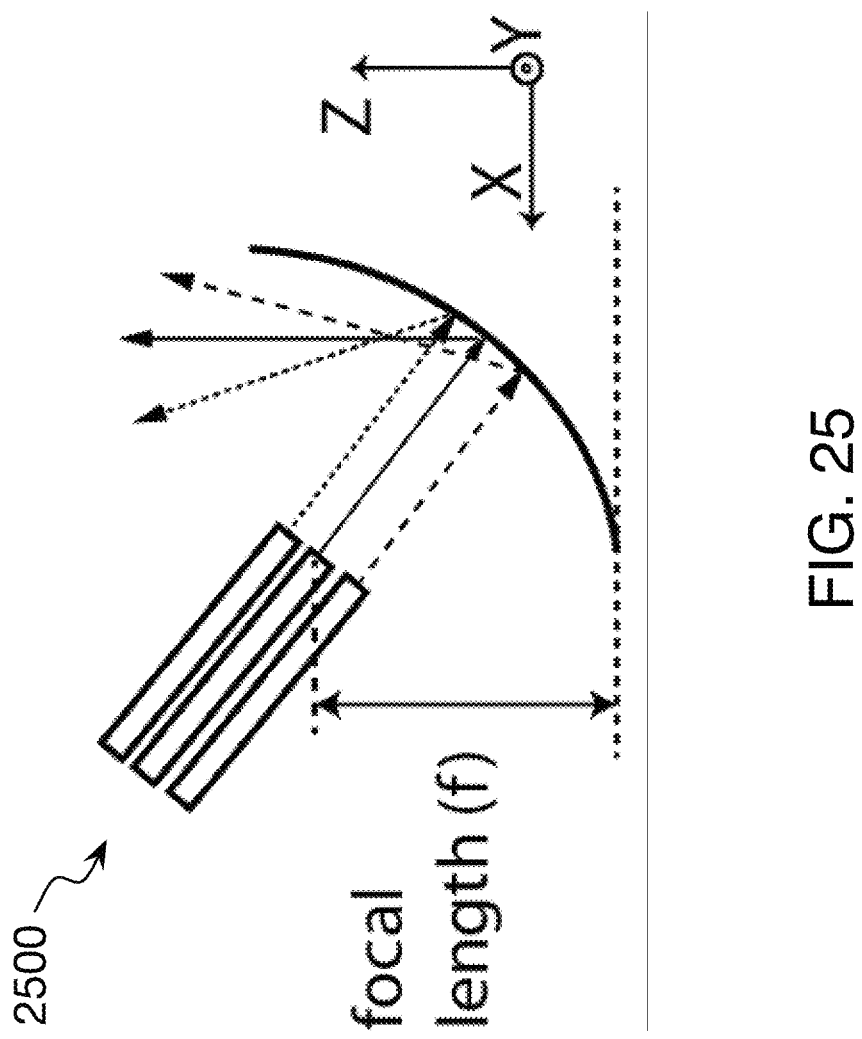
FIG. 25 is a schematic diagram of beam rotation corresponding to OPA position movement.

This property can be utilized if the output beams of the system are to be rotated in the XZ plane (rotation about the Y axis). For example, as shown in FIG. 25, if the OPA chip 2500 is moved along the loci of the focal points to the three different locations illustrated, the collimated output beam rotates in the XZ plane along the respective three different output angles illustrated.

This property can be used to cover a larger angular range. For example, this change in angular coverage around different respective central beam angles can be seen in FIG. 26A, for several OPA chips stacked side by side on a staircase structure of pedestals 2600 along a mirror 2602, with only the difference between the OPA chips being the position of their output waveguides and emitters in the YZ plane, close to the focal distance in the Z direction. Each OPA chip includes a linear array of emitter elements arranged along the Y axis. Each linear array of emitter elements is offset with respect to the other linear arrays along the Y axis (e.g., in this example the OPA chips are side-by-side with no overlap along the Y axis). Each linear array of emitter elements is also offset with respect to the other linear arrays along the Z axis. The linear arrays are at substantially the same position along the X axis.

Figure 26B:
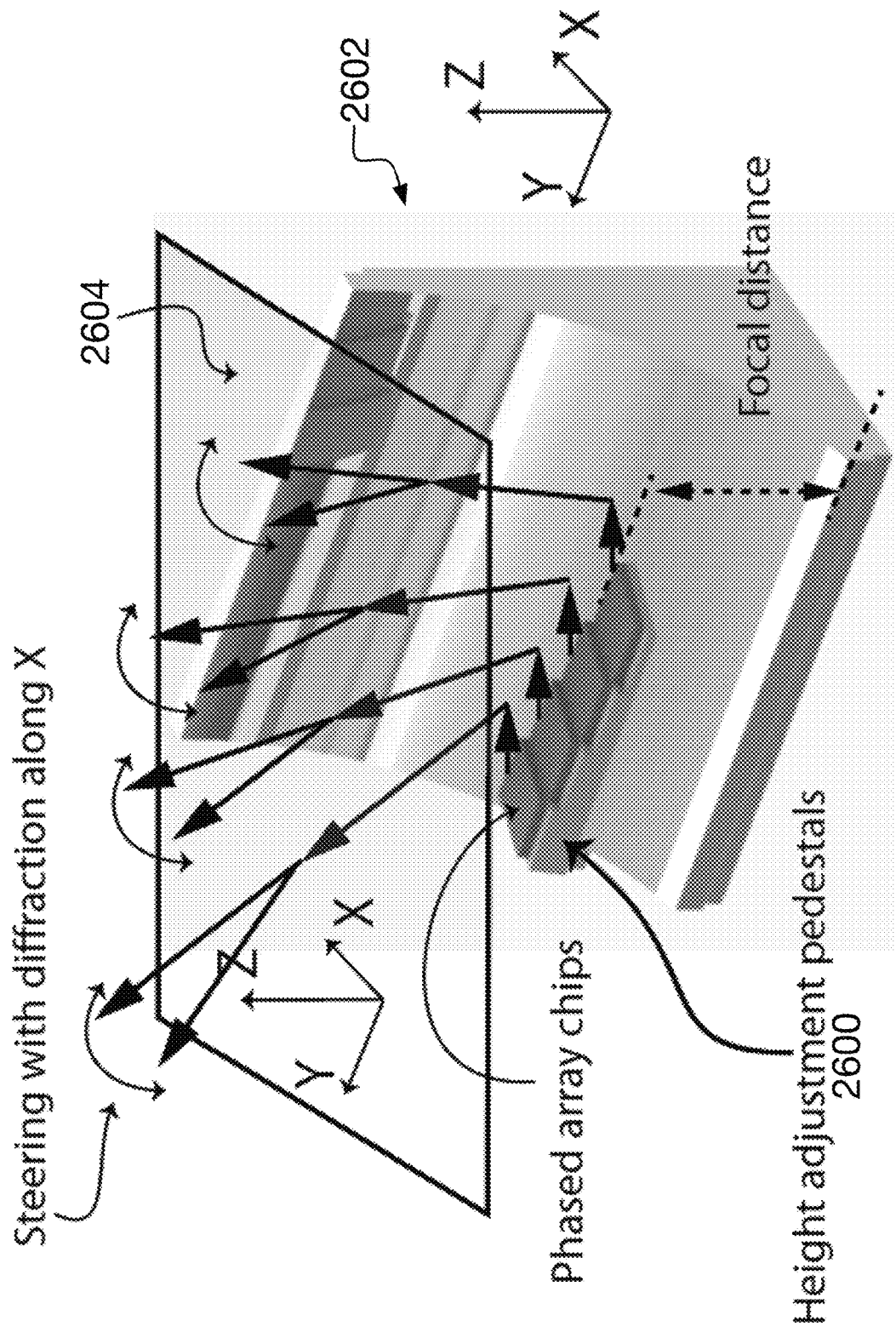
Figure 27:
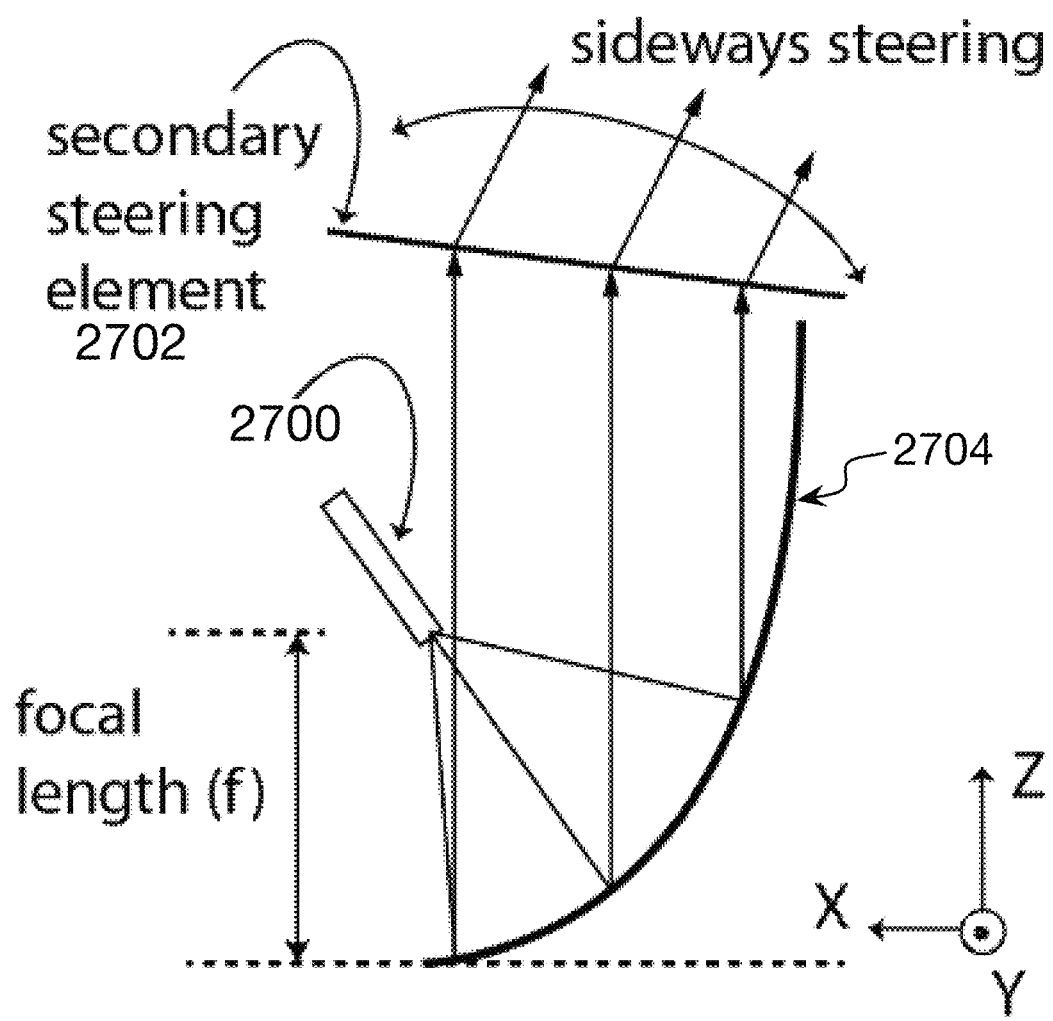
FIG. 27. is a schematic diagram of an OPA steering arrangement using a mirror and a secondary steering element.

This property allows a set of beams for which the static center of the beam covers a range of angles in the XZ plane. Nevertheless, in such configuration shown in FIG. 26A only steering along the Y axis (in the XY plane) is provided with the phase control. Referring to FIG. 26B, to add a steering capability in the XZ plane, similar to the example presented in FIG. 7 for lens-based systems, a diffractive/dispersive plate 2604 can be added in front of the mirror 2602 to steer the beams in X direction (i.e., in the XZ plane) as the wavelength changes. The cross-sectional view of this system is shown in FIG. 27. The steering of an OPA 2700 along the Y direction (in/out of the page) is performed using the phases applied by phase shifters in the OPA 2700, and the sideways steering is performed using a secondary steering element 2702 (e.g., a diffractive/dispersive plate) after reflection from a mirror 2704.

Figure 28:
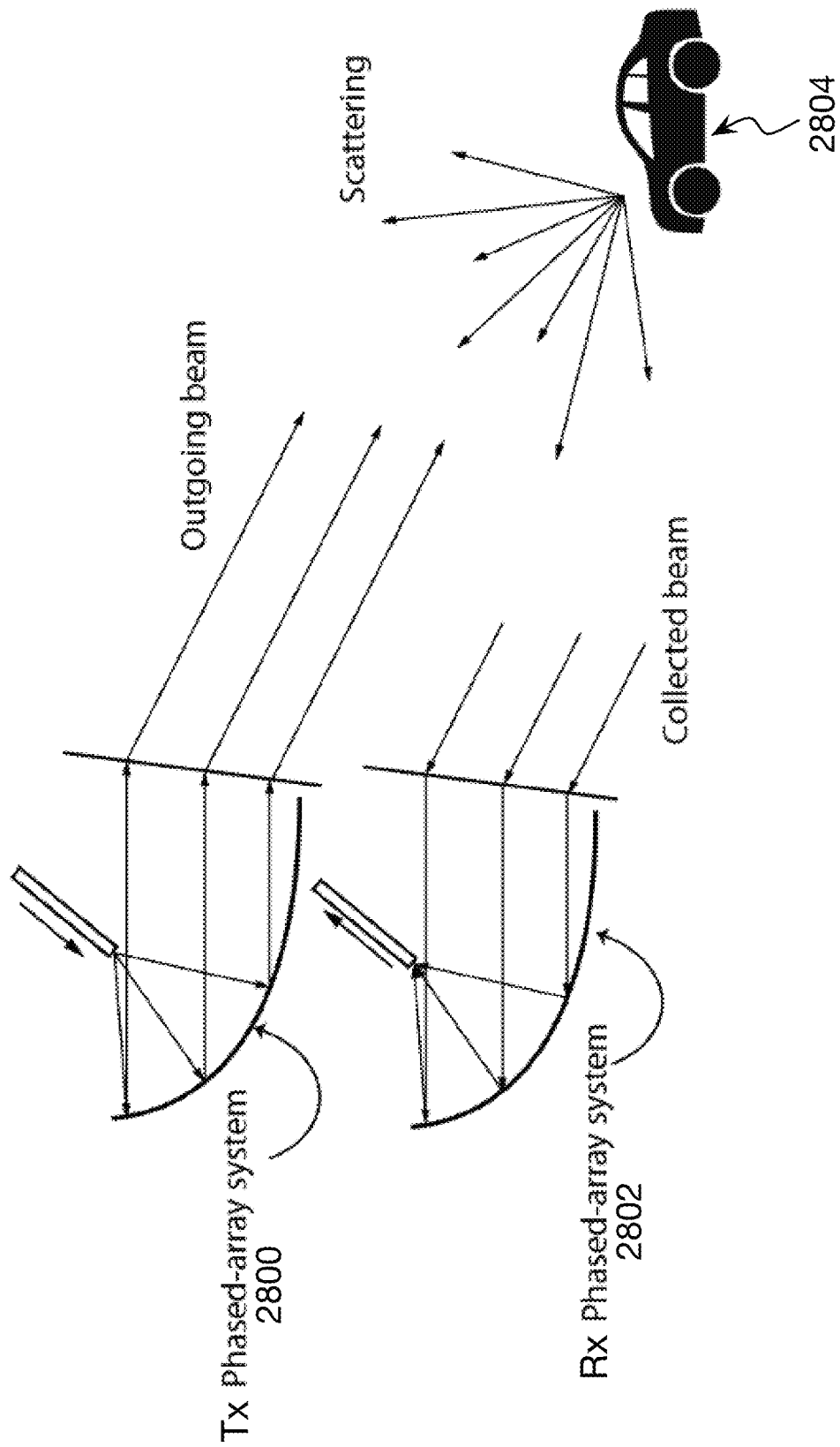
FIGS. 28 and 29 are schematic diagram of example LiDAR sensor systems.

The two-dimensional steering capability discussed here can be used for LiDAR sensor systems. For example, referring to FIG. 28, two mirror-based OPA systems can be placed side by side, both steering in the same directions using both OPA phase control and a diffractive/dispersive plate used as a secondary steering element. In this example, a Tx Phased-array system 2800 operates as the transmitter of the optical energy in an outgoing beam and an Rx Phased-array system 2802 collects the backscattered light in a collected beam. Utilizing FMCW or time of flight detection schemes, for example, the distance to an object 2804 and its velocity can be measured (with Doppler shift detection).

Figure 29:
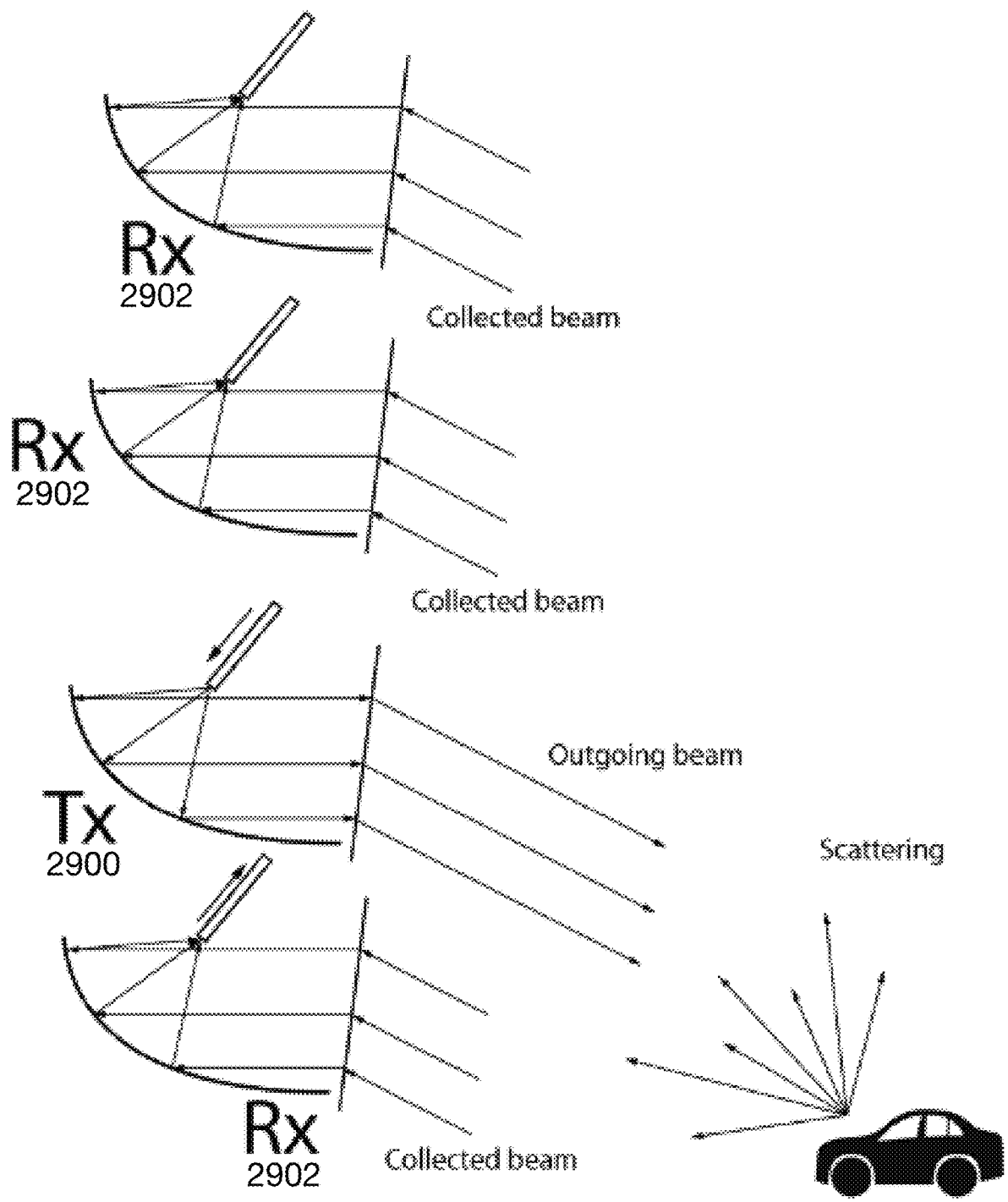

As can be seen in FIG. 29, a LiDAR sensor system can also be configured to include at least one transmitter (Tx) unit 2900 and multiple receiver (Rx) units 2902, which can be utilized to increase the light collection capability and the range of the LiDAR sensor system.

Figure 30A:
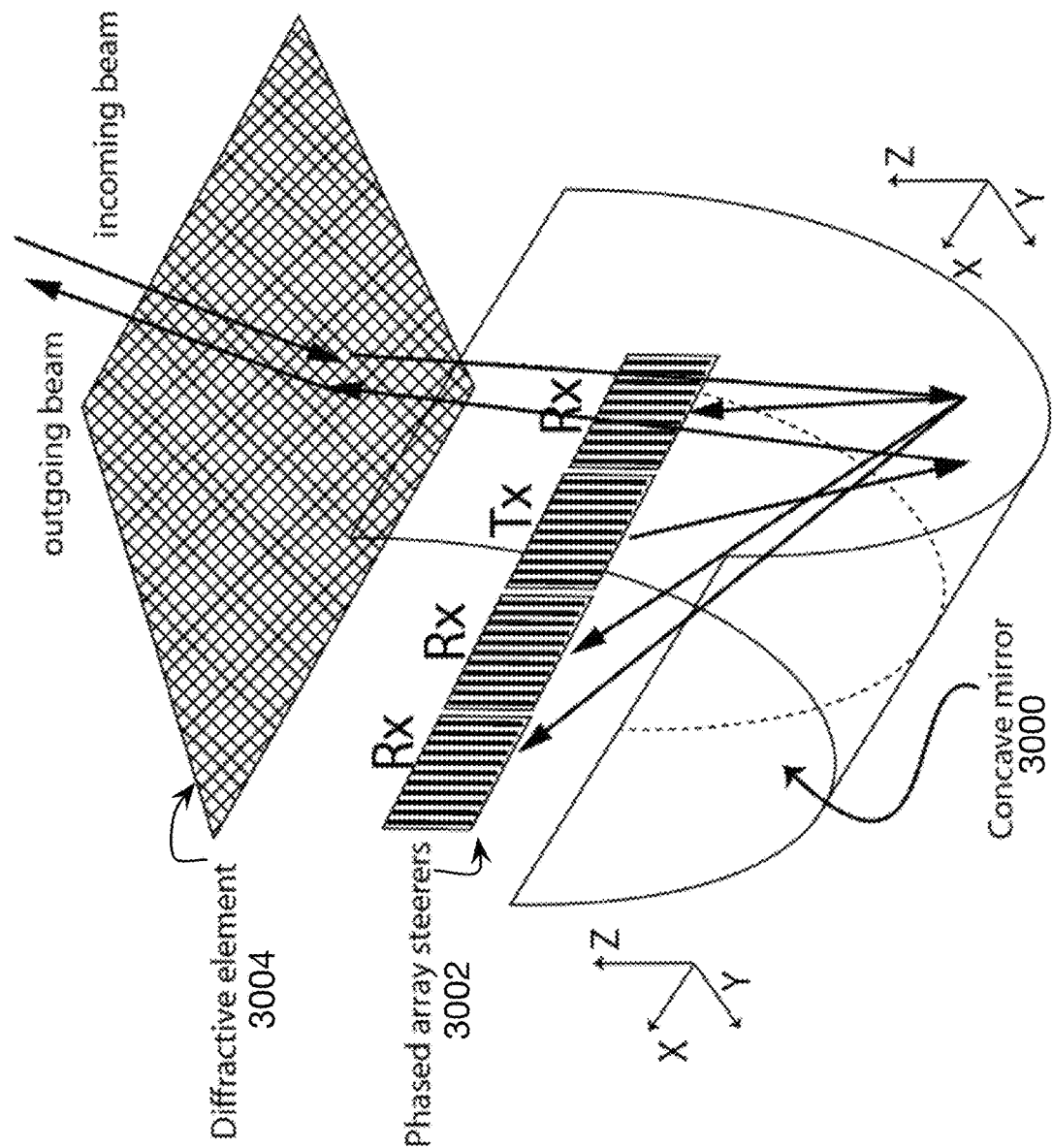
FIGS. 30A and 30B are schematic diagrams of OPA steering arrangements with multiple OPA chips.
Figure 30B:
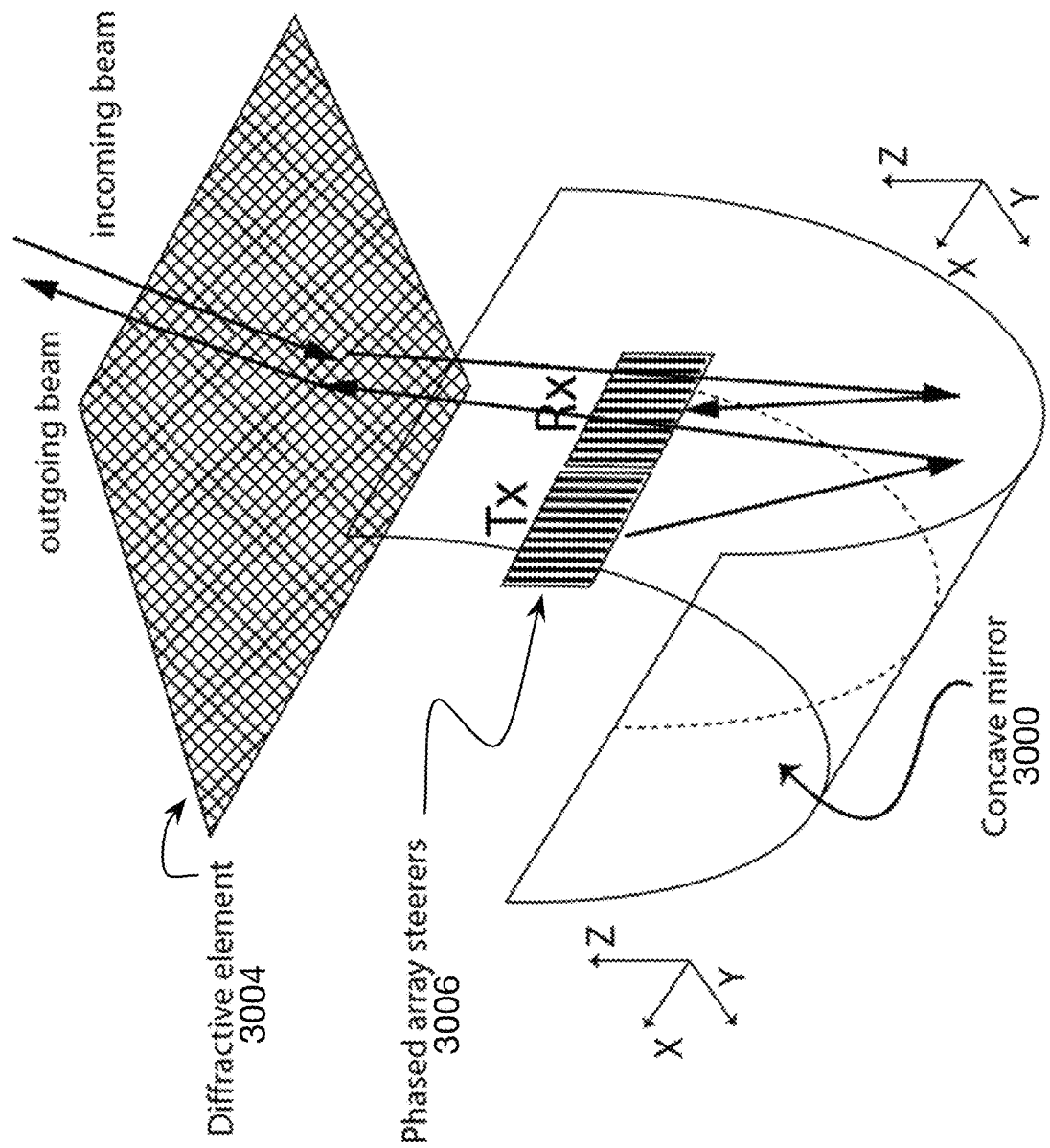

Alternatively, as can be seen in FIG. 30A, one concave collimating mirror 3000 can be utilized with an arrangement of several Tx and Rx OPA chips 3002 for a more compact system. The OPA chips 3002 are stacked along the X direction in this example, and only one diffractive optical element 3004 is used to perform Y steering for all of the OPA chips 3002. It is also possible that the same OPA chip can be configured to perform both transmission and reception if WDM or circulator components are utilized, for example. Alternatively, FIG. 30B shows an example in which the mirror and diffractive optics of each terminal can be simplified by placing the TX and RX OPA chips of a pair 3006 are arranged side by side in front of the same mirror 3000.

Figure 31:
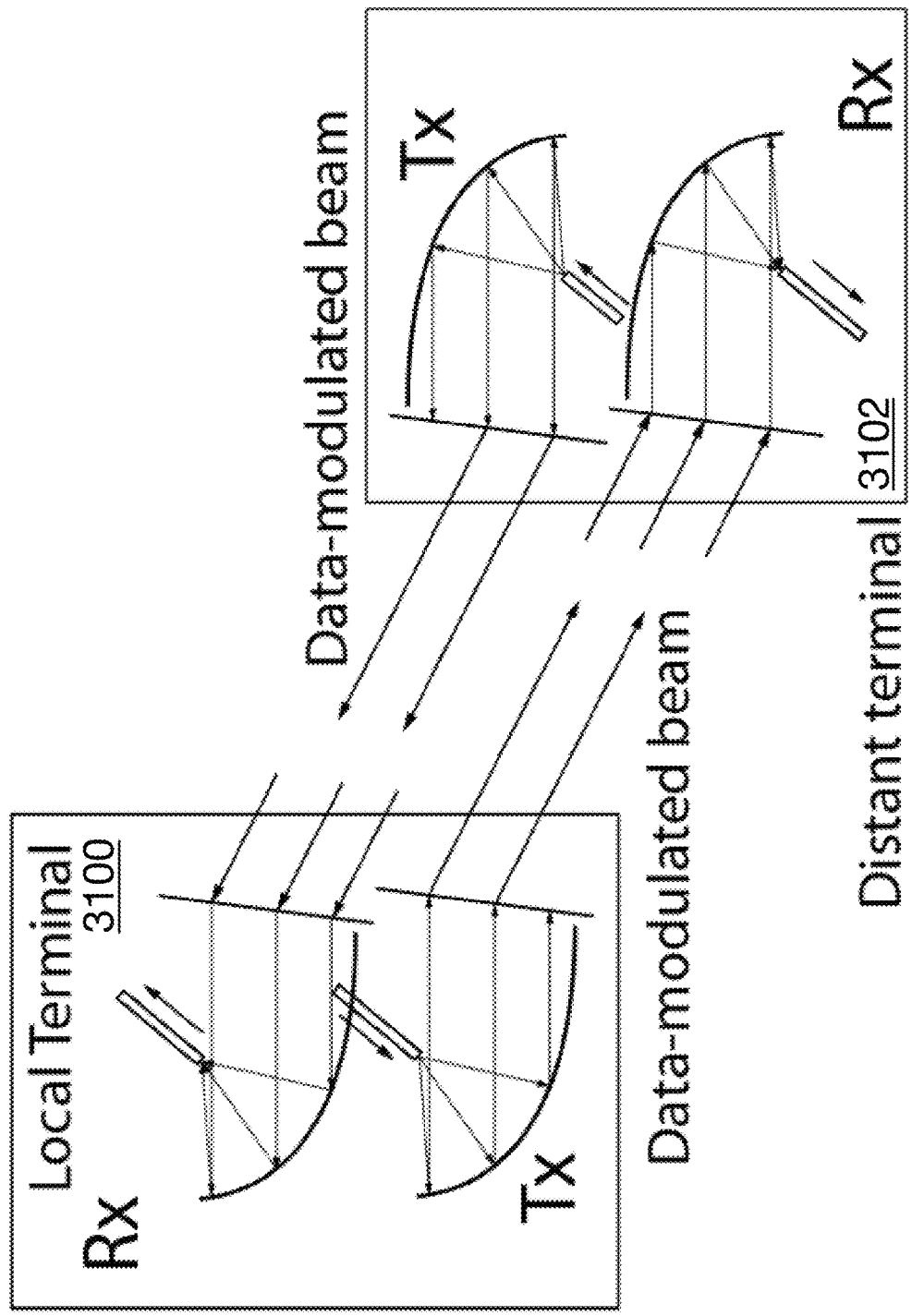
FIG. 31 is a schematic diagram of a communication system.

FIG. 31 shows an example of two OPA-based Tx/Rx transceiver systems, including a local terminal 3100 and distant terminal 3102 at each end of an optical link, which can be used to implement a WDM high data rate communication system with free space optical beams.

Figure 32A:
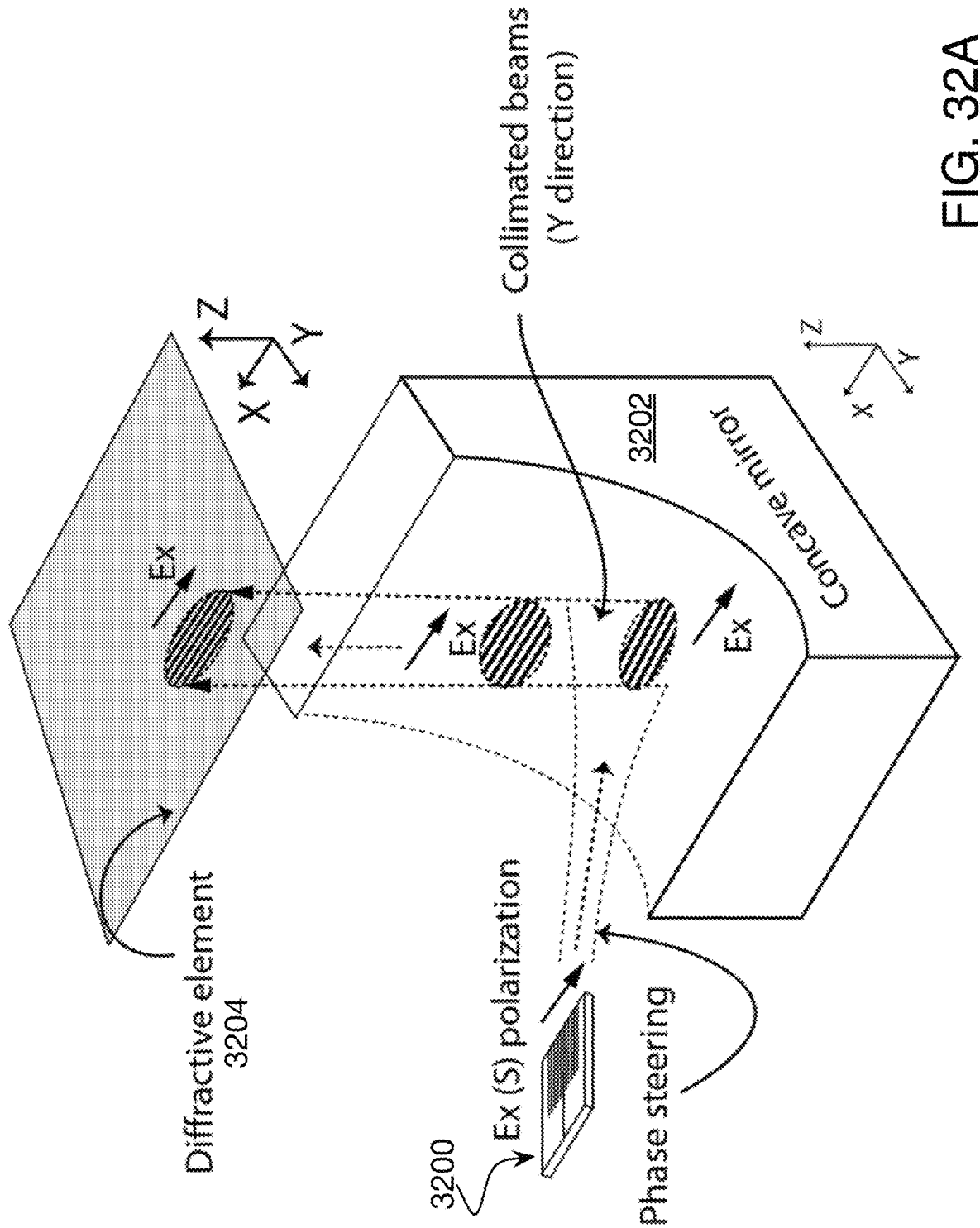
FIGS. 32A, 32B, and 32C are schematic diagrams of example secondary steering configurations.
Figure 32B:
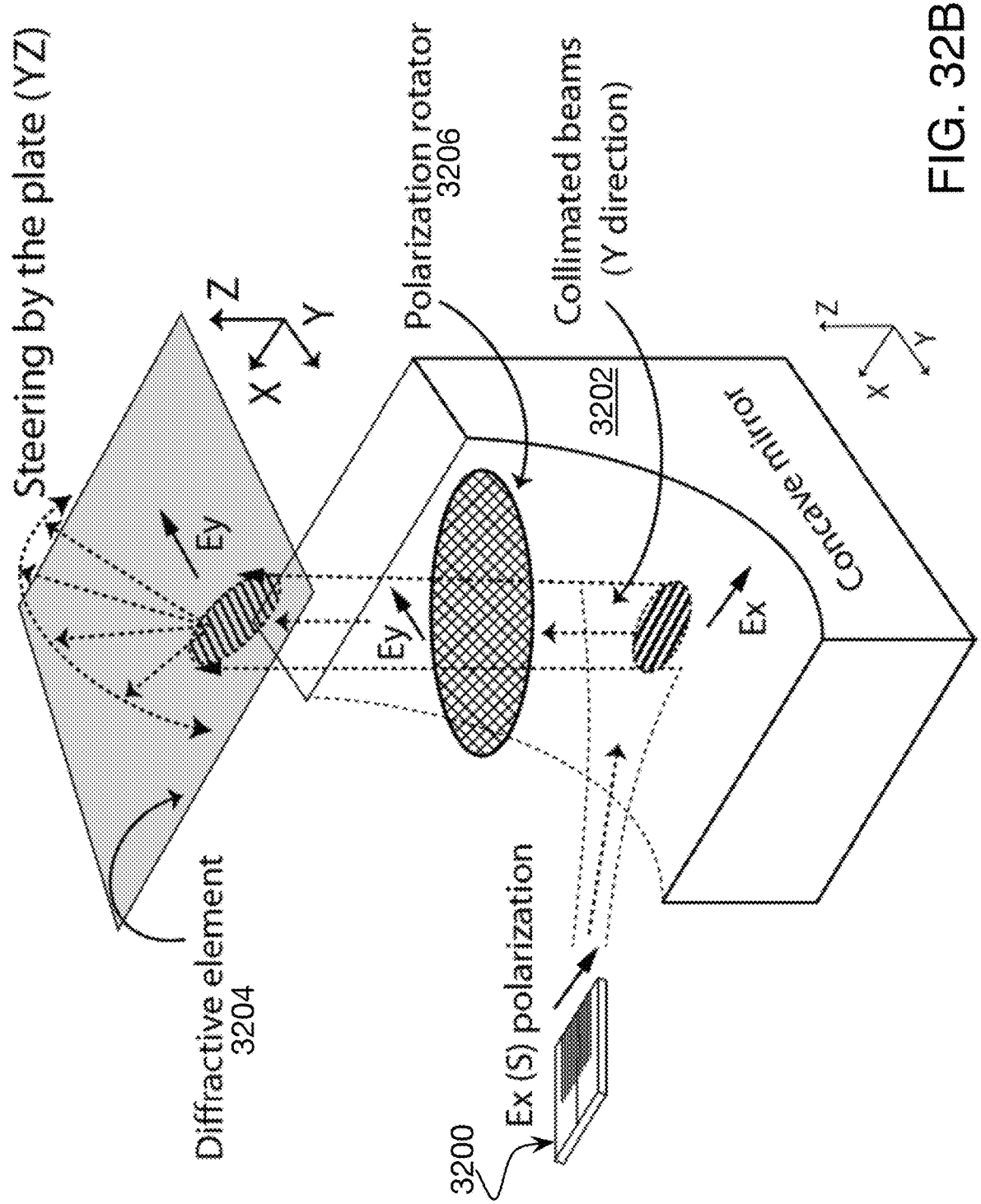

The secondary steering using a diffractive/dispersive element, or other secondary steering element, can be performed in a variety of different manners. For example, some secondary steering techniques depend on the polarization state of light. Referring to FIG. 32A if the polarization state of light from an OPA chip 3200 is transverse electric (TE)-like ($E_x$ dominant, where $E_x$ is the component of the electric field in the x-direction) the light hitting a concave mirror 3202 will be S-polarized ($E_x$) and the same is true for the light hitting a diffractive element 3204 (or other secondary steering element such as another form of dispersive element. Depending on the efficiency of the steering of light in YZ plane by the diffractive element 3204, the polarization of light can be rotated either at the OPA chip 3200 (e.g., by converting to transverse magnetic (TM)-like polarization), or before/after the diffractive element. FIG. 32B shows an example with a polarization rotator 3206 positioned between the concave mirror 3202 and the diffractive element 3204. Alternatively, diffractive element 3204 (or other form of dispersive element) could be designed to be polarization insensitive.

Figure 32C:
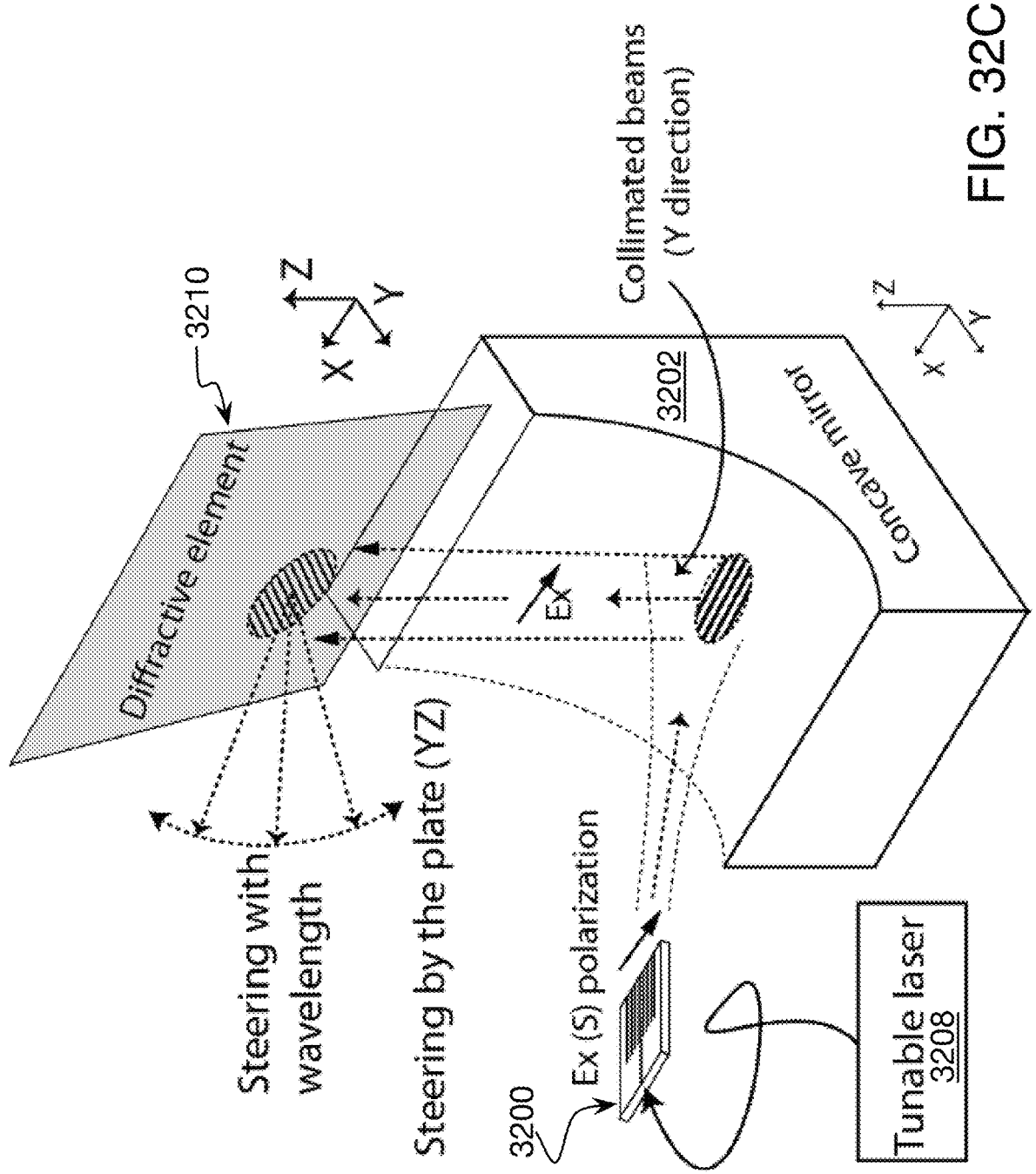
Figure 33A:
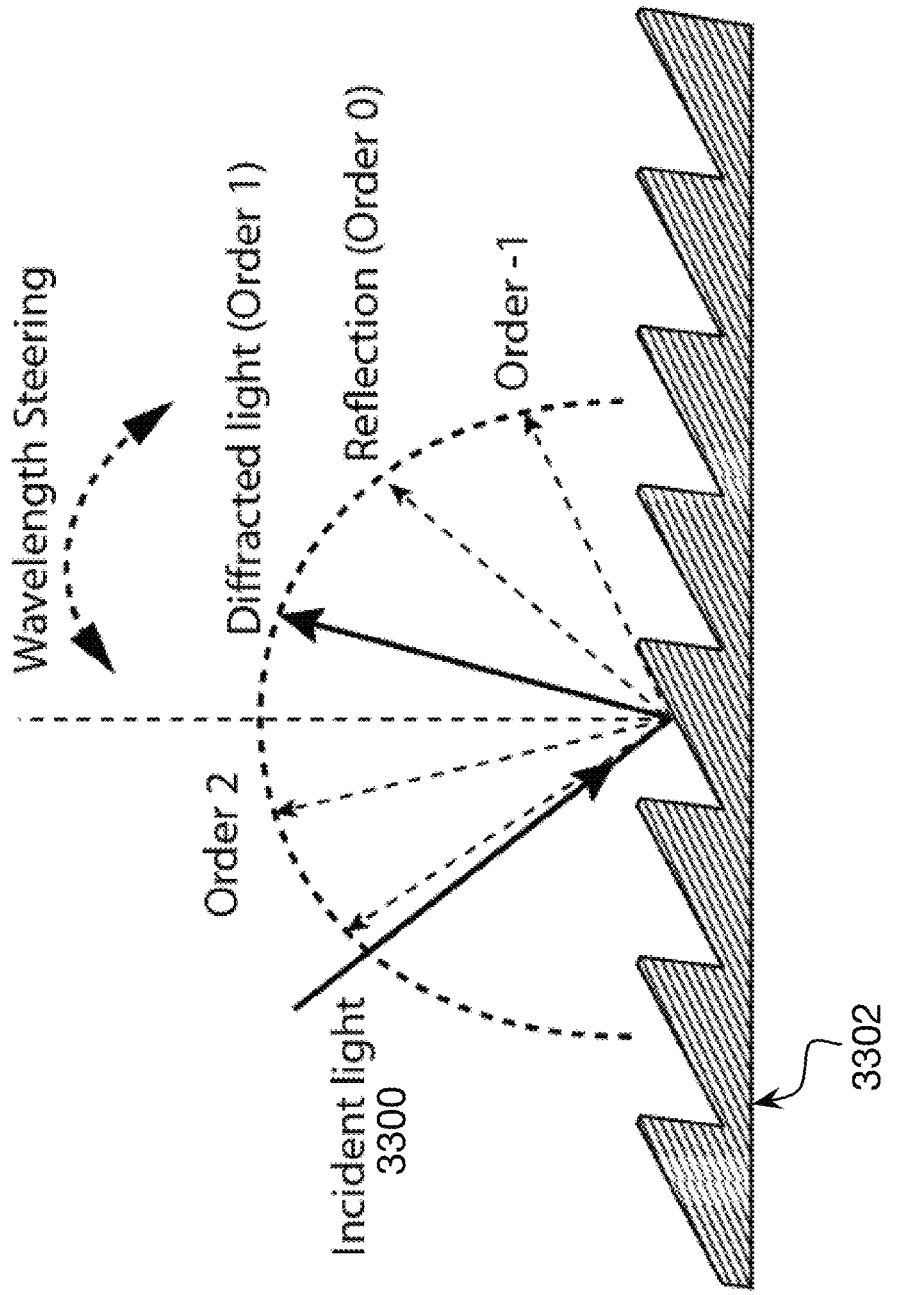
FIGS. 33A and 33B are schematic diagrams of example grating reflection used for wavelength-based steering.
Figure 33B:
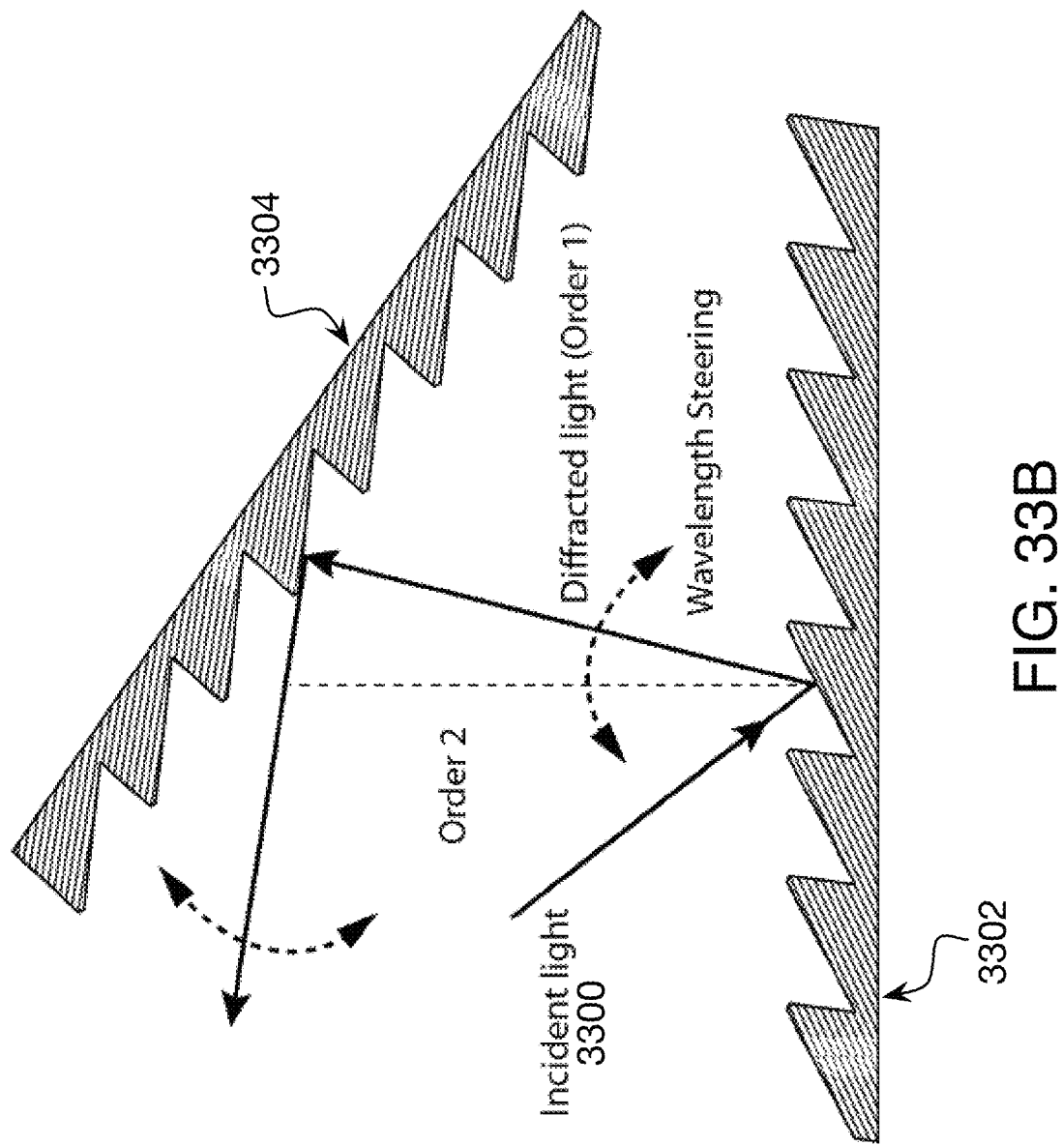

After determining the optimal polarization for a diffractive/dispersive element used for secondary steering, the range of steering, the speed, continuous versus discrete steering needed, and/or insertion loss can be used to determine the choice of the secondary steering mechanism. One method of steering, using a relatively simple diffractive/dispersive element and potentially more complicated laser and photonics chips utilizes wavelength change for implementing the secondary steering mechanism. For example, FIG. 32C includes a tunable laser 3208 providing light to the OPA chip 3200. The wavelength of the light provided by the tunable laser 3208 can be tuned across a certain wavelength range (e.g., 1400-1600 nm). The change in the wavelength leads dispersion-based steering of the beam after a reflective diffraction element 3210. For example, the reflective diffraction element 3210 can be a grating. FIG. 33A shows an example in which a beam of incident light 3300 is reflected off a grating 3302 and the diffracted beam direction is wavelength dependent. It is also possible to utilize multiple gratings to enhance this effect, as shown in FIG. 33B, which includes an additional grating 3304. When used for LIDAR, unwanted diffraction orders could be blocked with baffles, or other form of optomechanical assembly, in order to prevent unwanted/spurious reflections (e.g., from unused diffraction orders) from propagating back into the LIDAR system.

As an alternative, tunable grating structures with electrooptic, liquid crystal, or metasurface diffraction can be used instead of or alongside wavelength tuning.

A dispersive element can provide steering based on an angular dispersion of the dispersive element. For example, a beam steering apparatus can include an optical phased array having phase-shifter steering in a first dimension and that provides light incident onto a focusing element, which produces a collimated beam, which is provided to one or more subsequent beam-steering elements, which provide secondary steering in a second dimension in addition to the phase-shifter dimension. The one or more beam-steering elements could be a dispersive element that steers based on the wavelength of the input light. If a tunable laser source coupled to the optical phased array has optical bandwidth of $\Delta\lambda$, nm, a dispersive element with angular dispersion value of $\partial\theta/\partial\lambda$ can provide an angle change as a function of wavelength change of $\Delta\theta = (\partial\theta/\partial\lambda) \times \Delta\lambda$ degrees to achieve wavelength-based steering.

A dispersive element could be for example a diffraction element such as a grating, a refractive element such as a prism, a combination of both, or some other dispersive element. In some implementations, an optical wedge could also be used to increase the angular dispersion of the system.

FIGS. 34, 35A-35C, and 36 show examples of refractive elements used as steering elements.

Figure 34:
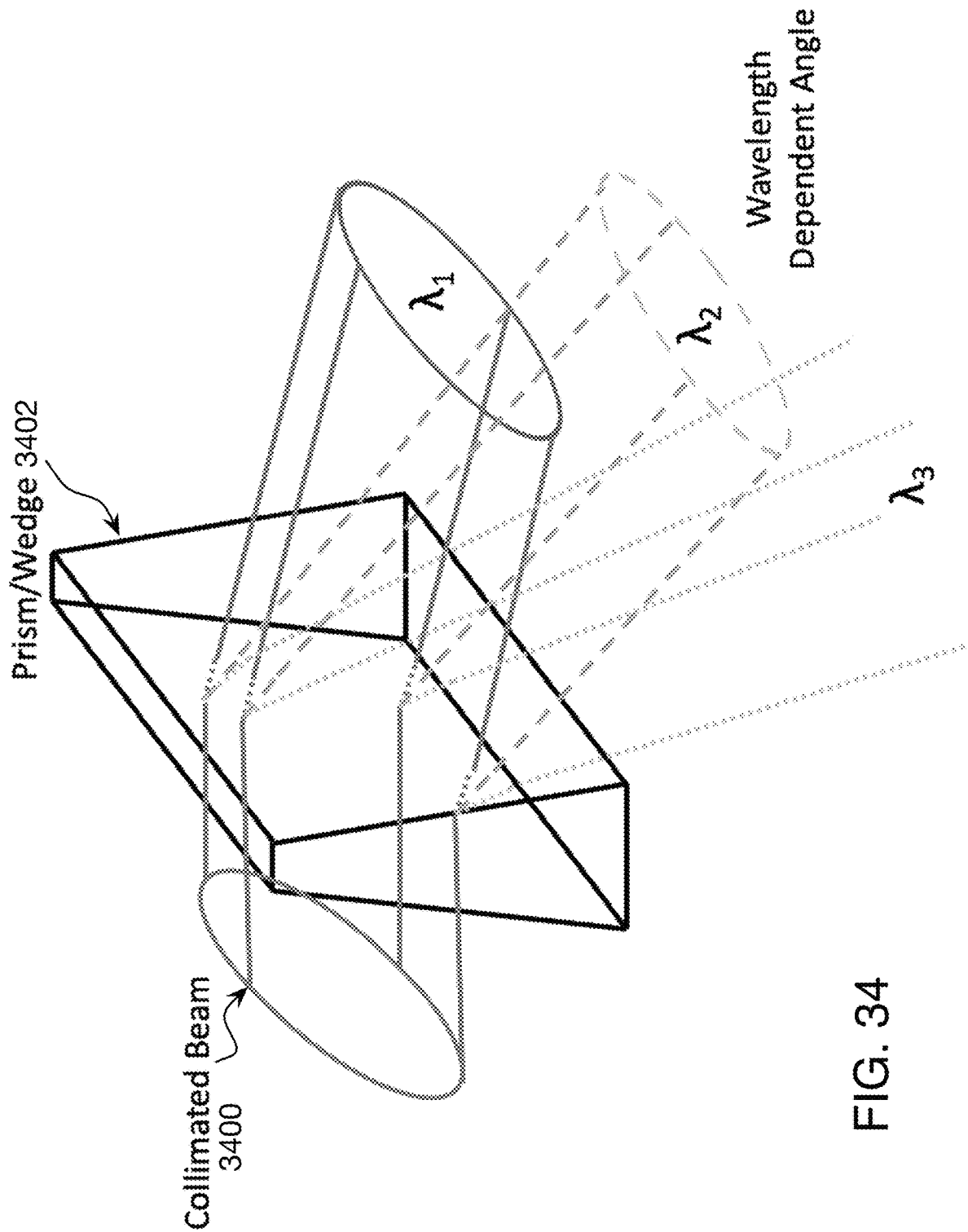
FIG. 34 is a schematic diagram of an example refractive steering mechanism using a prism or wedge.

FIG. 34 shows a 3-D perspective view of a collimated input beam 3400 that is provided to a prism/wedge refractive element 3402 used to provide wavelength-based steering. The input beam 3400 can be collimated, for example, as in a variety of implementations described herein, by using a beam coming after optical phased array and a cylindrical mirror. In this example, since the angle of refraction is wavelength dependent, the input beam 3400 is dispersed at three different angles when the input beam 3400 is tuned to three different respective wavelengths.

Figure 35A:
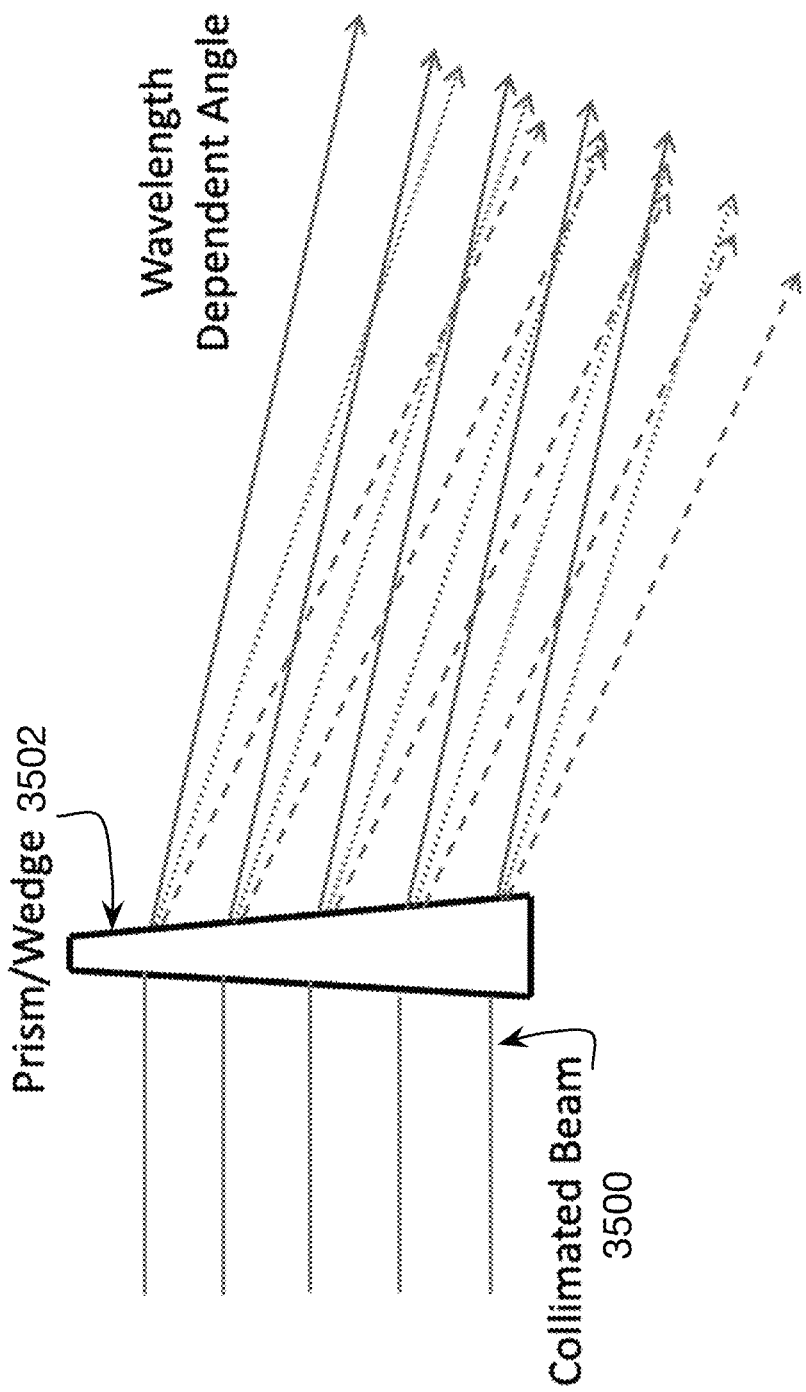
FIGS. 35A, 35B, and 35C are schematic diagrams of wavelength dependence for different refractive steering arrangements.

FIG. 35A shows a 2D side view of a collimated input beam 3500 that is provided to a prism/wedge refractive element 3502 used to provide wavelength-based steering, similar to the example shown in FIG. 34, where wavelength tuning is used to provide steering in the plane of this side view.

Figure 35B:
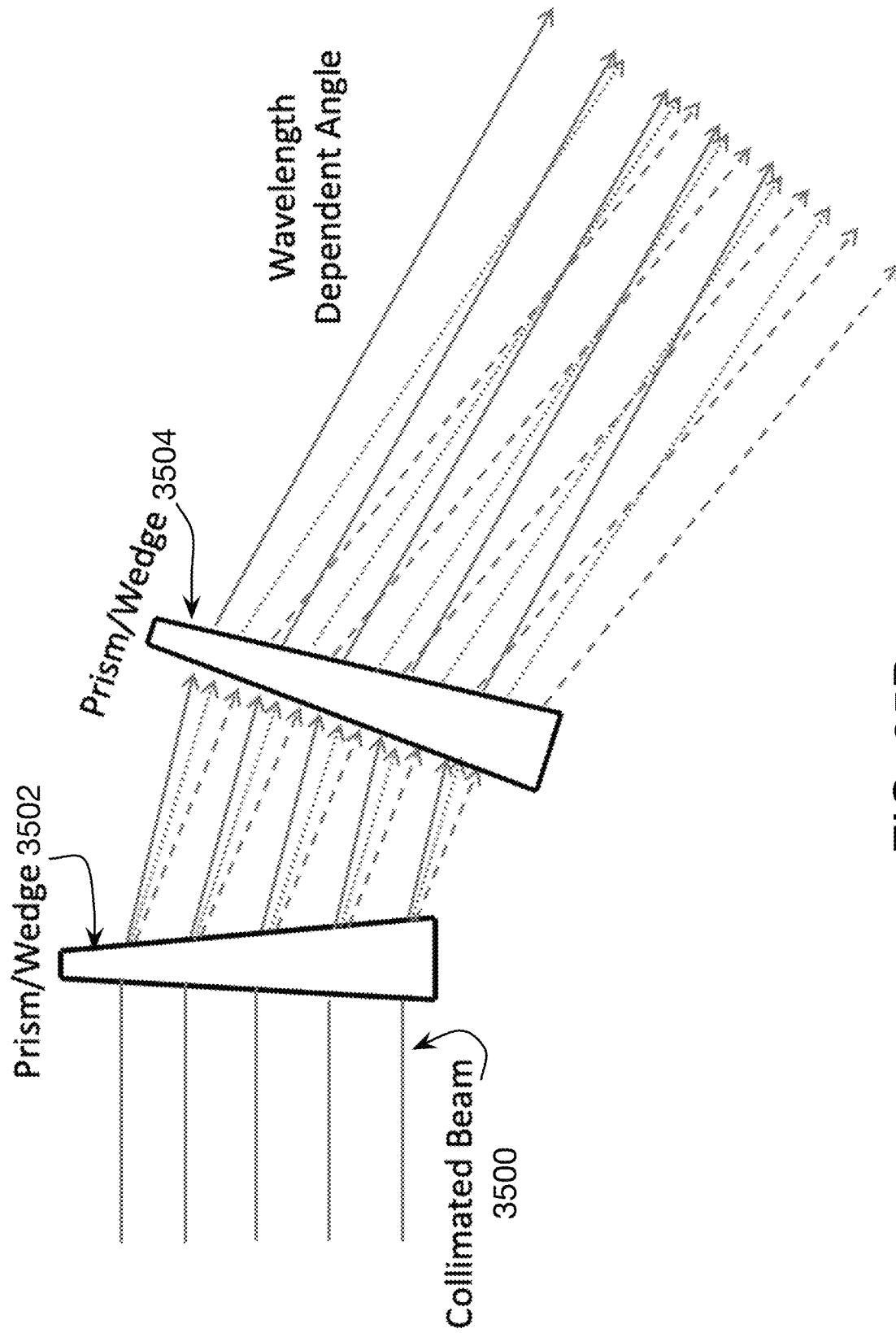

FIG. 35B shows a 2D side view of the collimated input beam 3500 being dispersed using the prism/wedge 3502 and subsequent prism/wedge 3504 used to further increase wavelength-based field of view when wavelength tuning is used for steering.

Figure 35C:
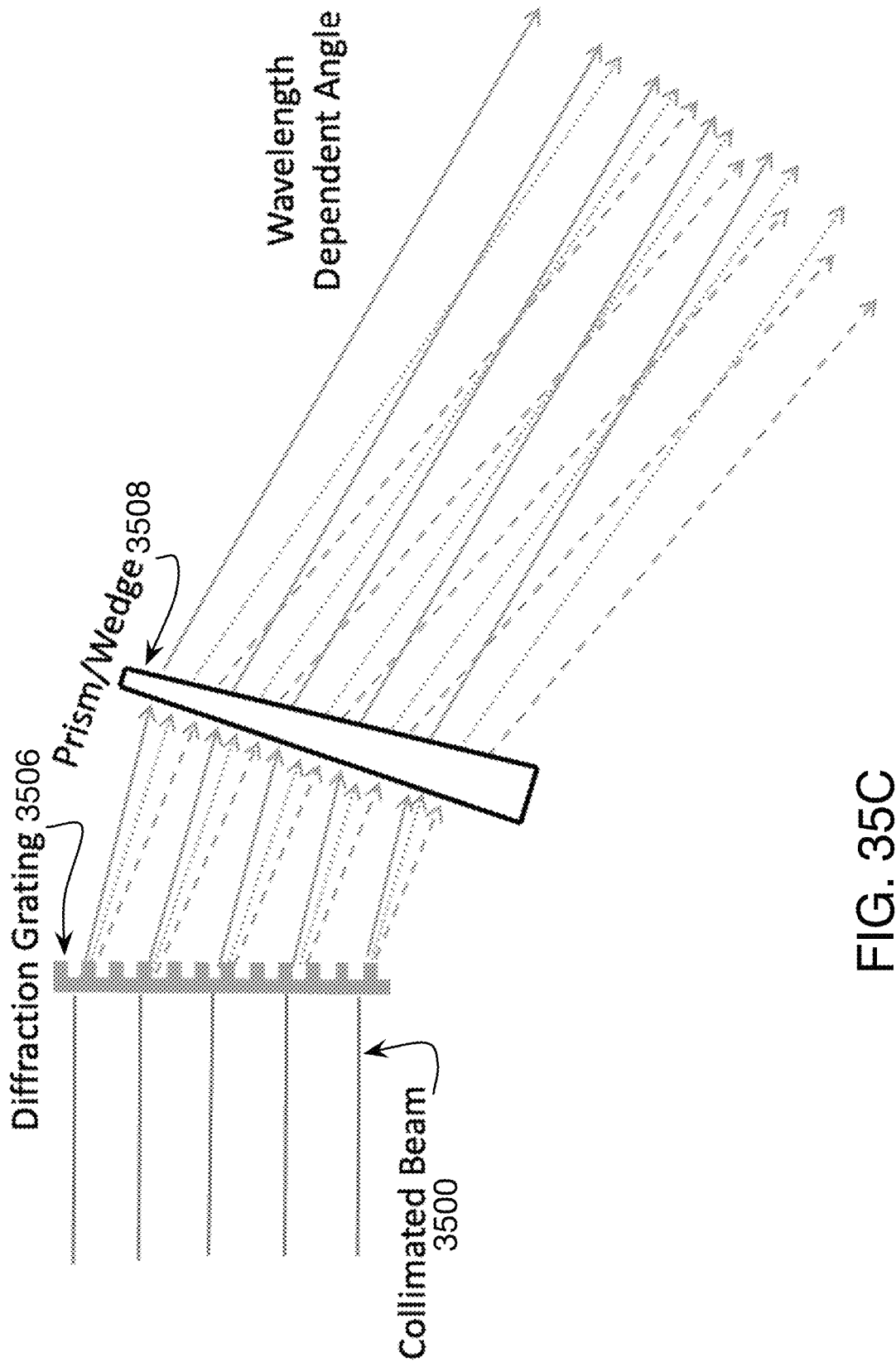

FIG. 35C shows 2D side view of the collimated input beam 3500 being dispersed using a diffraction grating 3506 (used in transmission) followed by a prism/wedge refractive element 3508 to further increase the angular dispersion. The diffraction grating 3506 produces high efficiency diffracted beam into a particular diffraction order, as indicated, for example, in FIG. 33A, except in transmission instead of reflection. However, some amount of light might still be directed into other, unwanted diffraction orders. If used for LIDAR, the light from those unwanted diffraction orders might propagate to some distant targets, reflect back into the LIDAR system, and overwhelm the operational return signal from the particular diffraction order used for measurement. This could be mitigated by blocking those unwanted diffraction orders using light baffles or an optomechanical assembly.

Figure 36:
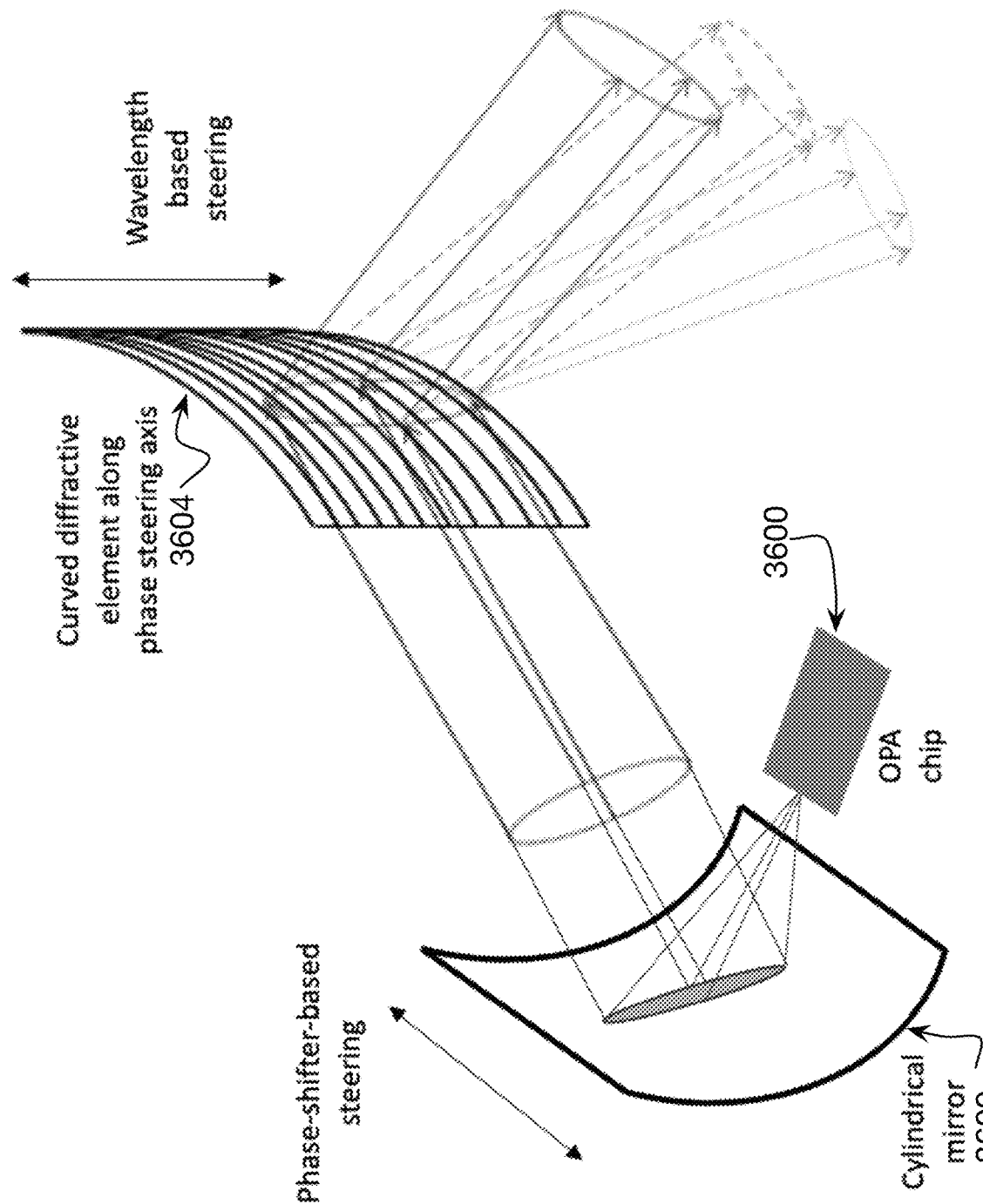
FIG. 36 is a schematic diagram of an example steering mechanism using a curved diffractive element.

FIG. 36 shows an example system that includes an OPA chip 3600, followed by a cylindrical mirror 3602, followed by a curved diffractive element 3604 (e.g., a diffraction grating used in transmission).

Various alternatives to these examples can be used. Referring again to the example of FIG. 34 (a 3D view), and FIG. 35A (a 2D view for the same configuration), the prism/wedge 3402 and 3502, should be long enough in the dimension perpendicular to the 2D view (i.e., x-dimension, out of the page) such that steering using the phase-based steering mechanism is able to capture the light coming from the upstream optical phased array and/or collimator element for the full horizontal (phase-based) angular field of view. Additionally, any number of prisms could be cascaded to further increase the angular dispersion, as shown in the example of FIG. 35B (with two prisms, in this example). For a certain range of steering angles, the dispersion of a two-prism system is twice that of a single prism and this could further scale with the number of prisms. A prism could be designed to maximize the angular dispersion. A diffraction grating could similarly be used as a dispersive element. Refractive index as well as the apex angle of the prism/wedge(s) control the amount of angular dispersion. The diffraction grating could be used in transmission or in reflection. A configuration that has the right balance between the diffraction efficiency, angular dispersion, insensitivity to polarization, and overall size could be chosen. Multiple diffraction gratings could be stacked one after the other in order to increase the angular dispersion of the system and to therefore increase the angular FOV in that dimension. FIG. 35C shows an example in which a transmission diffraction grating 3506 is followed by an optical prism/wedge 3508. The transmission diffraction grating 3506 provides an initial wavelength based FOV for the system, while the optical prism/wedge 3508 increases the beam divergence even further. If a diverging beam is incident on an optical prism/wedge, the angular divergence of the beam can be further increased.

In order for a transmission diffraction grating to pass the horizontal field of view provided by the phase shifters and to maintain high diffraction efficiency, the incident angle into the transmission diffraction grating can be configured to be a normal angle of incidence. This could be achieved by having a curved diffractive element (e.g., a diffraction grating), with one example of such a configuration shown in FIG. 36. This allows the configuration to mitigate the otherwise large incident angle (phase-shifter-based steering) onto the diffractive element.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus comprising:
   a photonic integrated circuit comprising an optical phased array comprising a plurality of antenna elements that are coupled to respective optical waveguides formed in the photonic integrated circuit, a focusing element at a fixed position relative to the optical phased array and configured to couple an optical beam to or from two or more of the plurality of antenna elements of the optical phased array, and a steering element at a fixed position relative to the focusing element and configured to steer the optical beam to or from the focusing element over a plurality of different angles within a steering range that is determined at least in part by at least one characteristic of the optical beam;

wherein at least one of the focusing element or the steering element is externally coupled to the photonic integrated circuit.

2. The apparatus of claim 1, wherein the steering element comprises a dispersive element.

3. The apparatus of claim 2, wherein the dispersive element comprises a diffractive element.

4. The apparatus of claim 2, wherein the dispersive element comprises a refractive element.

5. The apparatus of claim 4, wherein the refractive element comprises a prism.

6. The apparatus of claim 2, wherein the dispersive element comprises at least two prisms.

7. The apparatus of claim 2, wherein the dispersive element comprises at least one diffraction grating and at least one prism.

8. The apparatus of claim 1, wherein the focusing element comprises a lens.

9. The apparatus of claim 1, wherein the focusing element comprises a reflective surface, and the reflective surface is configured to provide both reflection and focusing.

10. The apparatus of claim 1, wherein the photonic integrated circuit, the focusing element, and the steering element are included in at least a portion of a LiDAR system.

11. The apparatus of claim 1, wherein the photonic integrated circuit, the focusing element, and the steering element are included in at least a portion of a free space optical link of a communication system.

12. The apparatus of claim 1, further comprising an optical source configured to provide an optical wave to the antenna elements of the optical phased array.

13. The apparatus of claim 12, wherein relative phase shifts among the antenna elements provide steering of the optical beam emitted from the optical phased array in a first plane.

14. The apparatus of claim 13, wherein the steering element comprises a dispersive element, the optical source comprises a tunable optical source configured to tune a wavelength of the optical wave provided to the antenna elements of the optical phased array, and the tuned wavelength provides steering of the optical beam emitted from the dispersive element in a second plane perpendicular to the first plane.

15. The apparatus of claim 1, wherein relative phase shifts among the antenna elements of the optical phased array provide steering of the optical beam emitted from the optical phased array in a first plane, and the steering element provides steering of the optical beam in a second plane perpendicular to the first plane.

16. The apparatus of claim 15, wherein the relative phase shifts among the antenna elements are applied through respective phase shifters coupled to the respective antenna elements.

17. An apparatus comprising:
an optical phased array comprising a plurality of antenna elements that are coupled to respective optical waveguides, a reflective surface at a fixed position relative to the optical phased array and configured to redirect an optical beam to or from two or more of the plurality of antenna elements of the optical phased array, and a steering element at a fixed position relative to the reflective surface and configured to steer the optical beam to or from the reflective surface over a plurality of different angles within a steering range that is determined at least in part by at least one characteristic of the optical beam.

18. The apparatus of claim 17, wherein the reflective surface is shaped to substantially collimate the optical beam in at least a first plane when the optical beam is redirected from the optical phased array.

19. The apparatus of claim 18, further comprising an optical source configured to provide an optical wave to the antenna elements of the optical phased array.

20. The apparatus of claim 19, wherein relative phase shifts among the antenna elements provide steering of the optical beam emitted from the optical phased array in a second plane perpendicular to the first plane.

21. The apparatus of claim 20, wherein the steering element comprises a diffractive element, the optical source comprises a tunable optical source configured to tune a wavelength of the optical wave provided to the antenna elements of the optical phased array, and the tuned wavelength provides steering of the optical beam emitted from the diffractive element in the first plane.

22. The apparatus of claim 20, wherein the steering element comprises a diffractive element that is configured to be tuned electronically to steer the beam in the first plane.

23. The apparatus of claim 17, wherein the optical phased array, the reflective surface, and the steering element are included in at least a portion of a LiDAR system.

24. The apparatus of claim 17, wherein the optical phased array, the reflective surface, and the steering element are included in at least a portion of a free space optical link of a communication system.

25. The apparatus of claim 17, wherein relative phase shifts among the antenna elements of the optical phased array provide steering of the optical beam emitted from the optical phased array in a first plane, and the steering element provides steering of the optical beam in a second plane perpendicular to the first plane.

26. An apparatus comprising:
an optical phased array comprising a plurality of antenna elements that are coupled to respective optical waveguides, a lens at a fixed position relative to the optical phased array and configured to couple an optical beam to or from two or more of the plurality of antenna elements of the optical phased array, and a steering element at a fixed position relative to the lens and configured to steer the optical beam to or from the lens over a plurality of different angles within a steering range that is determined at least in part by at least one characteristic of the optical beam.

27. The apparatus of claim 26, wherein the lens is shaped to substantially collimate the optical beam in at least a first plane when the optical beam is coupled from the optical phased array.

28. The apparatus of claim 27, further comprising an optical source configured to provide an optical wave to the antenna elements of the optical phased array.

29. The apparatus of claim 28, wherein relative phase shifts among the antenna elements provide steering of the optical beam emitted from the optical phased array in a second plane perpendicular to the first plane.

30. The apparatus of claim 29, wherein the steering element comprises a diffractive element, the optical source comprises a tunable optical source configured to tune a wavelength of the optical wave provided to the antenna elements of the optical phased array, and the tuned wavelength provides steering of the optical beam emitted from the diffractive element in the first plane.

31. The apparatus of claim 29, wherein the steering element comprises a diffractive element that is configured to be tuned electronically to steer the beam in the first plane.

32. The apparatus of claim 26, wherein the optical phased array, the lens, and the steering element are included in at least a portion of a LiDAR system.

33. The apparatus of claim 26, wherein the optical phased array, the lens, and the steering element are included in at least a portion of a free space optical link of a communication system.

34. The apparatus of claim 26, wherein relative phase shifts among the antenna elements of the optical phased array provide steering of the optical beam emitted from the optical phased array in a first plane, and the steering element provides steering of the optical beam in a second plane perpendicular to the first plane.

35. An apparatus comprising:
a plurality of optical phased arrays, and
a focusing element at a fixed position relative to the optical phased arrays and configured to couple optical beams to or from respective optical phased arrays of the plurality of optical phased arrays,
wherein the focusing element is positioned and configured to substantially collimate at least a first optical beam of the optical beams in at least a first plane when the first optical beam is coupled from a respective first optical phased array of the plurality of optical phased arrays, and
wherein the plurality of optical phased arrays are arranged on respective pedestals, where each optical phased array comprises a linear array of emitter elements arranged along a first axis, and each linear array of emitter elements is offset with respect to the other linear arrays along the first axis and offset with respect to the other linear arrays along a second axis perpendicular to the first axis.

36. The apparatus of claim 35, wherein the optical phased arrays and the focusing element are included in at least a portion of a LiDAR system.

37. The apparatus of claim 35, wherein the optical phased arrays and the focusing element are included in at least a portion of a free space optical link of a communication system.

38. The apparatus of claim 35, wherein the first optical phased array comprises a plurality of antenna elements that are coupled to respective optical waveguides and is configured to provide the first optical beam formed from interference among optical waves emitted from two or more of the plurality of antenna elements of the first optical phased array.

39. The apparatus of claim 38, wherein a second optical phased array of the plurality of optical phased arrays comprises a plurality of antenna elements that are coupled to respective optical waveguides and is configured to receive a second optical beam of the optical beams into two or more of the plurality of antenna elements of the second optical phased array.

40. The apparatus of claim 38, wherein a second optical phased array of the plurality of optical phased arrays comprises a plurality of antenna elements that are coupled to respective optical waveguides and is configured to provide a second optical beam of the optical beams formed from interference among optical waves emitted from two or more of the plurality of antenna elements of the second optical phased array.

41. An apparatus comprising:
an optical phased array comprising a plurality of antenna elements that are coupled to respective optical waveguides, and
a focusing steering element at a fixed position relative to the optical phased array and configured to receive an optical beam formed from interference among optical waves emitted from two or more of the plurality of antenna elements of the optical phased array,
wherein the focusing steering element is configured to: substantially collimate the optical beam in at least a first plane, and steer the optical beam in the first plane over a plurality of different angles within a steering range that is determined at least in part by at least one characteristic of the optical beam.

42. The apparatus of claim 41, wherein the focusing steering element comprises a focusing diffractive element.

43. The apparatus of claim 41, wherein the optical phased array and the focusing steering element are included in at least a portion of a LiDAR system.

44. The apparatus of claim 41, wherein the optical phased array and the focusing steering element are included in at least a portion of a free space optical link of a communication system.

45. An apparatus comprising:
an optical phased array comprising a plurality of antenna elements that are coupled to respective optical waveguides,
a reflective focusing element at a fixed position relative to the optical phased array and configured to couple an optical beam to or from two or more of the plurality of antenna elements of the optical phased array, and
a diffractive element at a fixed position relative to the reflective focusing element and configured to transmit the optical beam to or from the reflective focusing element.

46. The apparatus of claim 45, wherein the reflective focusing element comprises a reflective surface, and the reflective surface is configured to provide both reflection and focusing.

47. The apparatus of claim 45, wherein the diffractive element comprises a curved diffractive element that transmits the optical beam through the curved diffractive element.

48. The apparatus of claim 45, wherein the optical phased array and the reflective focusing element are included in at least a portion of a LiDAR system.

49. The apparatus of claim 45, wherein the optical phased array and the reflective focusing element are included in at least a portion of a free space optical link of a communication system.

* * * * *